(12) United States Patent
Jiang

(10) Patent No.: US 7,664,494 B2
(45) Date of Patent: Feb. 16, 2010

(54) SIGNALING AND PACKET RELAY METHOD AND SYSTEM INCLUDING GENERAL PACKET RADIO SERVICE ("GPRS")

(75) Inventor: Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 84 days.

(21) Appl. No.: 10/778,861

(22) Filed: Feb. 13, 2004

(65) Prior Publication Data

US 2004/0224680 A1    Nov. 11, 2004

Related U.S. Application Data

(60) Provisional application No. 60/447,533, filed on Feb. 14, 2003.

(51) Int. Cl.
*H04W 4/00* (2009.01)
(52) U.S. Cl. .................. 455/432.1; 455/433; 455/435.1
(58) Field of Classification Search .................. 455/433, 455/432.2, 435.1, 432.1; 370/338, 331
See application file for complete search history.

(56) References Cited

U.S. PATENT DOCUMENTS

| | | |
|---|---|---|
| 5,353,328 A | 10/1994 | Jokimies |
| 5,586,166 A | 12/1996 | Turban |
| 5,742,910 A | 4/1998 | Gallant et al. |
| 5,818,824 A | 10/1998 | Lu et al. |
| 5,854,982 A | 12/1998 | Chambers et al. |
| 5,901,359 A | 5/1999 | Malmstrom |
| 5,903,832 A | 5/1999 | Seppanen et al. |
| 5,930,701 A | 7/1999 | Skog |
| 5,940,490 A | 8/1999 | Foster et al. |
| 5,943,620 A | 8/1999 | Boltz et al. |
| 5,987,318 A | 11/1999 | Alperovich et al. |
| 5,987,323 A | 11/1999 | Huotori |
| 5,987,325 A | 11/1999 | Tayloe |
| 6,014,561 A | 1/2000 | Mölne |
| 6,052,604 A | 4/2000 | Bishop et al. |
| 6,058,309 A | 5/2000 | Huang et al. |

(Continued)

FOREIGN PATENT DOCUMENTS

AU         199940379         1/2000

(Continued)

OTHER PUBLICATIONS

Michael Mouly, "The GSM system for Mobile Communications", pp. 103-104. Cell and Sys, 1992.*

(Continued)

*Primary Examiner*—George Eng
*Assistant Examiner*—Muthuswamy G Manoharan
(74) *Attorney, Agent, or Firm*—Arent Fox LLP

(57) ABSTRACT

A method and system for roaming mobile communications between networks is described. One embodiment includes a plurality of messages from a home network subscriber device that is device is roaming outside the home network. A communications link is established with a destination network, including modifying at least one of the messages such that the message appears to the destination network to originate from a partner network of the destination network. Both voice and data are transmitted via the communications link.

42 Claims, 11 Drawing Sheets

U.S. PATENT DOCUMENTS

| | | | |
|---|---|---|---|
| 6,075,855 | A | 6/2000 | Christiansen et al. |
| 6,085,084 | A | 7/2000 | Christmas |
| 6,138,005 | A | 10/2000 | Park |
| 6,138,009 | A | 10/2000 | Birgerson |
| 6,148,197 | A | 11/2000 | Bridges et al. |
| 6,163,701 | A | 12/2000 | Saleh et al. |
| 6,185,295 | B1 | 2/2001 | Frederiksen et al. |
| 6,185,436 | B1 | 2/2001 | Vu |
| 6,192,255 | B1 | 2/2001 | Lewis et al. |
| 6,195,532 | B1 | 2/2001 | Bamburak et al. |
| 6,208,864 | B1 | 3/2001 | Agrawal et al. |
| 6,356,756 | B1 | 3/2002 | Koster |
| 6,456,845 | B1 | 9/2002 | Drum et al. |
| 6,456,859 | B1 | 9/2002 | Desblancs et al. |
| 6,463,298 | B1 | 10/2002 | Sorenson et al. |
| 6,466,786 | B1 | 10/2002 | Wallenius |
| 6,505,050 | B1 | 1/2003 | Brudos et al. |
| 6,515,974 | B1* | 2/2003 | Inoue et al. .......... 370/331 |
| 6,574,481 | B1 | 6/2003 | Rathnasabapathy et al. |
| 6,603,761 | B1 | 8/2003 | Wang et al. |
| 6,603,968 | B2 | 8/2003 | Anvekar et al. |
| 6,611,516 | B1 | 8/2003 | Pirkola et al. |
| 6,628,934 | B2 | 9/2003 | Rosenberg et al. |
| 6,671,523 | B1 | 12/2003 | Niepel et al. |
| 6,684,073 | B1* | 1/2004 | Joss et al. .......... 455/433 |
| 6,693,586 | B1 | 2/2004 | Walters et al. |
| 6,738,622 | B1* | 5/2004 | Stadelmann et al. ..... 455/435.1 |
| 6,738,636 | B2 | 5/2004 | Lielbridis |
| 6,764,003 | B1 | 7/2004 | Martschitsch et al. |
| 6,782,264 | B2 | 8/2004 | Anderson |
| 6,795,444 | B1 | 9/2004 | Vo et al. |
| 6,856,818 | B1 | 2/2005 | Ford |
| 6,876,860 | B1 | 4/2005 | Berg et al. |
| 6,920,487 | B2 | 7/2005 | Sofer et al. |
| 6,925,299 | B1 | 8/2005 | Sofer et al. |
| 6,961,559 | B1 | 11/2005 | Chow et al. |
| 6,963,543 | B2 | 11/2005 | Diep et al. |
| 6,968,383 | B1 | 11/2005 | Heutschi et al. |
| 6,975,852 | B1 | 12/2005 | Sofer et al. |
| 6,978,156 | B1 | 12/2005 | Papadopoulos et al. |
| 7,020,479 | B2 | 3/2006 | Martschitsch |
| 7,139,570 | B2 | 11/2006 | Elkarat et al. |
| 7,184,764 | B2 | 2/2007 | Raviv et al. |
| 7,231,431 | B2 | 6/2007 | Sofer et al. |
| 2002/0009199 | A1 | 1/2002 | Ala-Laurila et al. |
| 2002/0012351 | A1 | 1/2002 | Sofer et al. |
| 2002/0037708 | A1 | 3/2002 | McCann et al. |
| 2002/0087631 | A1 | 7/2002 | Sharma |
| 2002/0101858 | A1 | 8/2002 | Stuart et al. |
| 2002/0101859 | A1* | 8/2002 | Maclean .......... 370/352 |
| 2002/0160763 | A1 | 10/2002 | Mittal et al. |
| 2002/0187780 | A1 | 12/2002 | Souissi |
| 2002/0191575 | A1 | 12/2002 | Kalavade et al. |
| 2002/0196775 | A1 | 12/2002 | Tuohino |
| 2003/0003930 | A1* | 1/2003 | Allison et al. .......... 455/466 |
| 2003/0017843 | A1 | 1/2003 | Noblins |
| 2003/0050047 | A1 | 3/2003 | Ala-Luukko |
| 2003/0051041 | A1 | 3/2003 | Kalavade et al. |
| 2003/0064723 | A1 | 4/2003 | Thakker |
| 2003/0069922 | A1 | 4/2003 | Arunachalam |
| 2003/0129991 | A1 | 7/2003 | Allison et al. |
| 2003/0133421 | A1 | 7/2003 | Sundar Rangamani et al. |
| 2003/0139180 | A1 | 7/2003 | McIntosh et al. |
| 2003/0165135 | A1* | 9/2003 | Itzkovitz et al. .......... 370/352 |
| 2003/0208560 | A1 | 11/2003 | Inoue |
| 2003/0224795 | A1 | 12/2003 | Wilhoite et al. |
| 2003/0229791 | A1 | 12/2003 | De Jong |
| 2004/0053610 | A1 | 3/2004 | Kim |
| 2004/0120552 | A1 | 6/2004 | Borngraber et al. |
| 2004/0131023 | A1* | 7/2004 | Auterinen .......... 370/328 |
| 2004/0132449 | A1 | 7/2004 | Kowarsch |
| 2004/0196858 | A1 | 10/2004 | Tsai et al. |
| 2004/0229601 | A1 | 11/2004 | Zabawskyj et al. |
| 2004/0236836 | A1 | 11/2004 | Appelman |
| 2005/0021834 | A1 | 1/2005 | Coulombe |
| 2005/0047378 | A1 | 3/2005 | Wuschke et al. |
| 2005/0064883 | A1 | 3/2005 | Heck et al. |
| 2005/0186939 | A1 | 8/2005 | Barnea et al. |
| 2005/0186979 | A1 | 8/2005 | McCann et al. |
| 2005/0215250 | A1 | 9/2005 | Chava et al. |
| 2005/0232282 | A1 | 10/2005 | Silver et al. |
| 2005/0250493 | A1 | 11/2005 | Elkarat et al. |
| 2006/0003775 | A1 | 1/2006 | Bull et al. |
| 2006/0009204 | A1 | 1/2006 | Ophir |
| 2006/0025129 | A1 | 2/2006 | Wolfman et al. |
| 2006/0052113 | A1 | 3/2006 | Ophir et al. |
| 2006/0068778 | A1 | 3/2006 | Della-Torre |
| 2006/0068786 | A1 | 3/2006 | Florence |
| 2006/0079225 | A1 | 4/2006 | Wolfman et al. |
| 2006/0079236 | A1 | 4/2006 | Del Pino et al. |
| 2006/0148459 | A1 | 7/2006 | Wolfman et al. |
| 2006/0205404 | A1 | 9/2006 | Gonen et al. |
| 2006/0211420 | A1 | 9/2006 | Ophir et al. |
| 2007/0021118 | A1 | 1/2007 | Ophir et al. |
| 2007/0049269 | A1 | 3/2007 | Ophir et al. |
| 2007/0054665 | A1 | 3/2007 | Elkarat et al. |
| 2007/0072587 | A1 | 3/2007 | Della-Torre et al. |
| 2007/0178885 | A1 | 8/2007 | Lev et al. |

FOREIGN PATENT DOCUMENTS

| | | | |
|---|---|---|---|
| CA | 2281041 | A1 | 2/2001 |
| EP | 0899 974 | A2 | 3/1999 |
| GB | 2322998 | * | 9/1998 |
| WO | WO 98/26621 | A2 | 6/1998 |
| WO | WO 98/26626 | A2 | 6/1998 |
| WO | WO 00/01179 | | 1/2000 |
| WO | WO 00/18156 | | 3/2000 |
| WO | WO 00/51375 | A | 8/2000 |
| WO | WO 00/79761 | A | 12/2000 |
| WO | WO 00/79825 | A | 12/2000 |
| WO | WO 01/65884 | A1 | 9/2001 |
| WO | WO 02/41641 | A2 | 5/2002 |
| WO | WO 03/019969 | A1 | 3/2003 |
| WO | WO 03/043367 | A | 5/2003 |
| WO | WO 03/065660 | A | 8/2003 |
| WO | WO2004/075598 | | 9/2004 |
| WO | WO2005/101857 | | 10/2005 |
| WO | WO2008/012815 | | 1/2008 |

OTHER PUBLICATIONS

"Digital cellular telecommunications system (Phase 2+); Specification of the SIM Application Toolkit for the Subscriber Identity Module-Mobile Equipment (SIM-ME) interface (GSM 11.14 version 8.3.0 Release 1999)" ETSI TS 101 267 V8.3.0, Aug. 2000, pp. 1-69 and pp. 114-115 (XP-002222021).

"Digital cellular telecommunications system (Phase 2+); Universal Mobile Telecommunications System (UMTS); General Packet Radio Service (GPRS) Service description; Stage 2 (3GPP TS 23.060 version 5.4.0 Release 5)" ETSI TS 123 060 V5.4.0, Dec. 2002, pp. 1-207 (XP-014007573).

"Digital cellular telecommunications system (Phase 2+); Universal Mobile Telecommunications System (UMTS); General Packet Radio Service (GPRS); GPRS Tunnelling Protocol (GTP) across the Gn and Gp interface (3GPP TS 29.060 version 5.4.0 Release 5)" ETSI TS 129 060 V5.4.0, Dec. 2002, pp. 1-102 (XP-002298277).

Ala-Laurila, et al., "Wireless LAN Access Network Architecture for Mobile Operators," IEEE Communications Magazine, Nov. 2001, pp. 82-89 (XP-001107810).

Brünen, M. "Roaming im Zugangsnetz Mit OWLAN überall zu Hause sein," Net—Zeitschrift Fuer Kommunikationsmanagement, Huthig Verlag, Heilderberg, 2002, pp. 39-42 (XP-001122438).

GSM Association Permanent Reference Document: IR.33, PRD IR.33 "GPRS Roaming Guidelines," version 3.2.0, Apr. 3, 2003, pp. 1-20 (XP-002298278).
Ostrowski, F., "Roaming und Handover zwischen UMTS und Funk-LA," NTZ (Nachrichtentechnische zeitschrift), 2002, pp. 24-26 (XP-001124094).
Salkintzis, et al., "WLAN-GPRS Integration for Next-Generation Mobile Data Networks," IEEE Wireless Communications, Oct. 2002, pp. 112-123 (XP-001132263).
Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).
"Universal Mobile Telecommunications system (UMTS) NAS Functions Related to Mobile Station MS in Idle Mode" ETSI TS 123 122 V3.1.0, Jan. 2000, pp. 1-33.
"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.
Salman A. Baset et al., "An analysis of the Skype Peer-to-Peer Internet Telephony Protocol", Department of Computer Science, Sep. 15, 2004, 12 pages.
Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release.
GSM978 on CAMEL Application protocol Digital cellular telecommunications system (Phase 2+); Customized Applications for Mobile network Enhaced Logic (CAMEL); CAMEL Application Part.
GSM 902 on MAP Specification Digital Cellular Telecommunications (Phase 2+); Mobile Application Part (MAP) Specification (3GPP TS 09.02 version 7.9.0 Release 1998).
Q760-Q769 on ISUP Signaling, Function and Procedure.
Q.761 (Functional description of the ISDN User Part of CCITT Signaling System No. 7).
Q762 (General Functions of CCITT Signaling System No. 7 ISDN User Part Messages and parameters).
Q 763 (Formats and codes of CCITT Signaling System No. 7 ISDN User Part Message and parameters).
Q 764 (1999), Signaling System No. 7—ISDN User Part signaling procedures.
Q 730 (1999), ISDN User Part supplementary services.
Q 711 (1996), Functional description of signaling connection control part.
Q 712 (1996), Definition and function of signaling connection control part messages.
Q713 (1996), Signaling connection control part formats and codes.
Q 714 (1996), Signal connection control part procedures.
Q 716 (1993), Signaling Connection Control Part (SCCP) performance.
GSM 340 on SMS Digital cellular telecommunications system (Phase 2+); Technical realization of the Short Message Service (SMS); (GSM 03.40 version 7.4.0 Release 1998).
SMPP Forum: SMPP Protocol Document Version:—Oct. 12, 1999 Issue 1.2.
Universal Mobile Telecommunications System (UMTS); Multimedia Messaging Service (MMS), Functional description; Stage 2 (3GPP TS 23.140 version 4.2.0 Release 4).
GSM 379 on CAMEL Digital cellular telecommunications system (Phase 2+); Customized Applications for Mobile network Enhanced Logic (CAMEL); CAMEL Application Part (CAP) specification (GSM.

Technical Specification3$^{rd}$ Generation Partnership Project; Technical Specification Group Services and System Aspects; Service accessibility (Release 1999).
Signaling procedure and the Mobile Application Part (MAP) (Release 1999).
Q1214-Q1218 on Intelligent Networks IMS architectures, 3GPP, and 3GPP2.
GMS 408 on radio interface layer 3; Digital cellular telecommunications system (Phase 2+); Mobile radio interface layer 3 specification (GSM 04.08 version 7.4.2 Release 1998).
GSM 322 network selection Digital cellular telecommunications system (Phase 2+); functions related to Mobile Station (MS) in idle mode and group receive mode (GSM 03.22 version 8.3.0 Release 1999).
GSM 23122 network selection 3GPP TS 23.122 V3.9.0 (Dec. 2002) Technical Specification; 3$^{rd}$ Generation Partnership Project; Technical Specification Group Core Network; NAS Functions related.
GSM 22011 service accessibility; 3 GPP TS 22.011 V3.8.0 (Sep. 2002) Technical Specification; 3$^{rd}$ Generation Partnership Project; Technical Specification Group Services and System Aspects; Service.
3 GPP 29010; 3 GPP TS 29.010 V3.10.0 (Dec. 2002); Technical Specification; 3$^{rd}$ Generation Partnership Project; Technical Specification Group Core Network; Information element mapping.
GSM 318 on CAMEL Basic Call Handling; Digital cellular telecommunications system (Phase 2+) Basic call handling; Technical realization (GSM 03.18 version 6.6.0 Release 1997).
ITU-T Recommendation Q. 766 (1993), Performance objectives in the integrated services digital network application.
ITU-T Recommendation Q. 765 (1998), Signaling system No. 7—Application transport mechanism.
ITU-T Recommendation Q. 769.1 (1999), Signaling system No. 7—ISDN user part enhancements for the support of Number Portability.
Q771-775X TCAP.
GSM 1111 SIM and Mobile Interface.
GSM 1114 SIM Toolkit.
IR 7320 Steering of Roaming.
GSM 348 Security and OTA.
GSM 31048 Security and OTA.
GSM 23119 Gateway Location Register.
GSM 408 Mobile Radio Interface Network Layer.
GSM 23122 Mobile Station Procedure.
GSM 24008 Mobile Radio Interface Network Layer.
GSM 25304 Idle Mode Selection.
GSM 29010 Error Network Mapping.
GSM 29002 Map Protocol.
3G TS 22.078 version 3.2.0 Release 1999 UMTS CAMEL.
3G TS 23.278 version 6.0.0. Release 6 UMTS CAMEL-IMS interworking.
GSM 360 GPRS.
GSM 960 GPRS Tunneling Protocol.
GSM 23060 GPRS.
GSM 29060 GPRS Tunneling Protocol.
GSM 23012 Location Update.
Q701-705 on SS7 MTP.
European Search Report mailed Jun. 5, 2007, in related EP 04781142.7-1525.

* cited by examiner

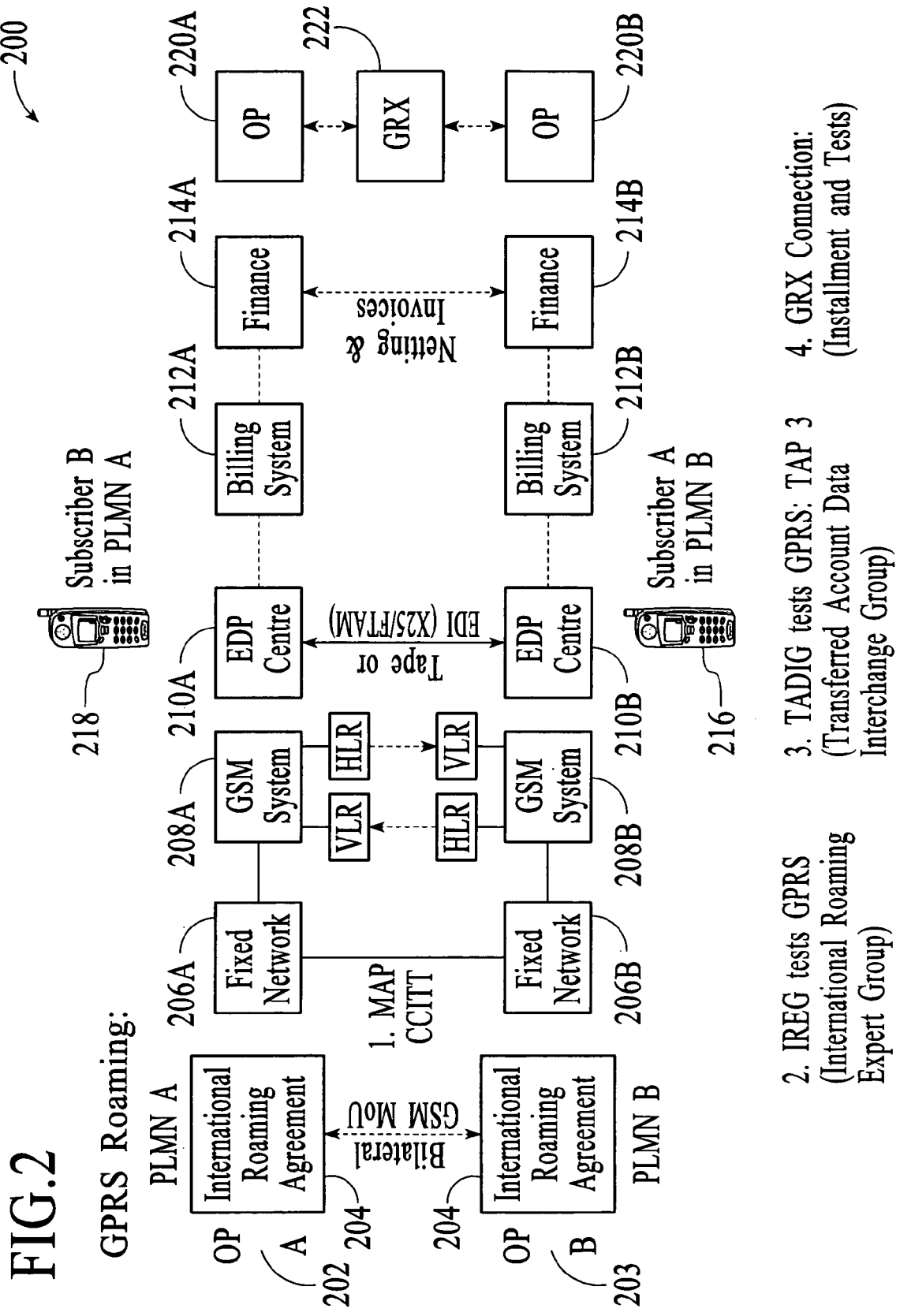

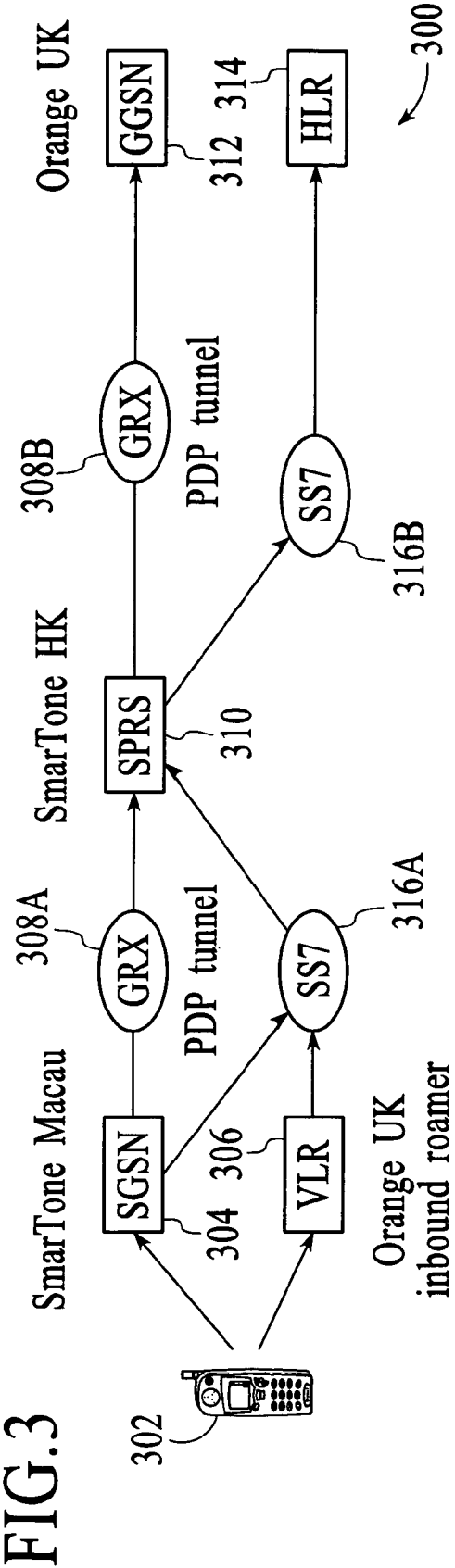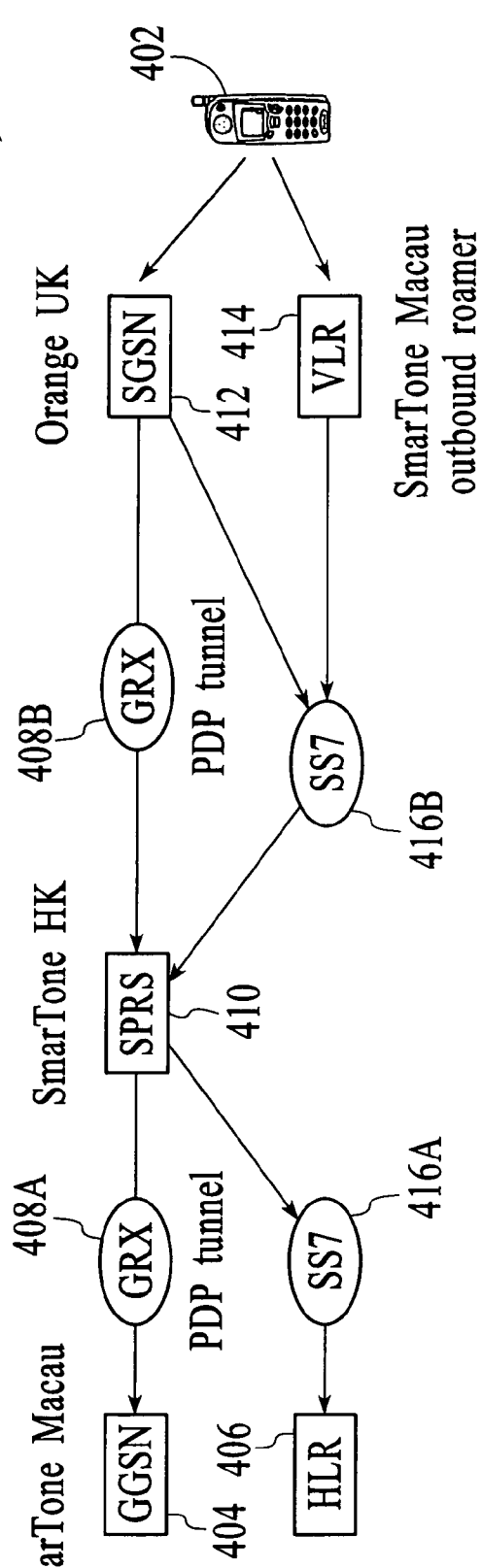

SIGNALING AND PACKET RELAY METHOD AND SYSTEM INCLUDING GENERAL PACKET RADIO SERVICE ("GPRS")

RELATED APPLICATION

This application claims priority from U.S. Provisional Patent Application No. 60/447,533, filed Feb. 14, 2003, which is incorporated by reference herein in its entirety.

TECHNICAL FIELD

The disclosed embodiments relate to wireless communications systems. In particular, disclosed embodiments relate to roaming wireless communications, in which a subscriber of a network provider communicates outside the provider's home network.

Acronyms
International Mobile Subscriber Identity (of HPMN) (IMSI);
Mobile Subscriber ISDN Number (phone number) (MSISDN);
Single IMSI Multiple MSISDN Service (SIMM);
Subscriber Identity Module (SIM);
Home Public Mobile Network who intends to provide MSISDN Service (HPMN);
Foreign Public Mobile Network who intends to partner with HPMN for Multiple MSISDN Service (FPMN);
Mobile Switching Center (MSC);
Signaling Gateway (SG);
Gateway MSC (GMSC);
GMSC in HPMN (GMSC-H);
GMSC in FPMN (GMSC-F);
GMSC in VPMN (GMSC-V);
MSISDN of the Multiple MSISDN Service allocated by HPMN in HPMN numbering plan (MSISDN-H);
MSISDN of the Multiple MSISDN Service subscriber in the FPMN (Co-operating VPMN) numbering plan (MSISDN-F);
Signaling System 7 (SS7);
Visited Mobile Switching Center (VMSC);
Serving VMSC in HPMN (VMSC-H);
Serving VMSC in FPMN (VMSC-F);
Serving VMSC in VPMN (VPMN is not HPMN/FPMN) (VMSC-V);
Associated Public Mobile Network for SMS Inter-working (APMN);
Call Detail Record (CDR);
Call Forwarding in Busy (CFB);
Call Forwarding on Not Reachable (CFNR);
Call Forwarding on No Reply (CFNRy);
Call Forwarding Unconditional (CFU);
Circuit Switch Data (CSD);
Digital Distribution Frame (DDF);
Forwarded-To-Number typically used in Call Forwarding (FTN);
General Packet Radio Service (GPRS);
Gateway GPRS Service Node (GGSN);
GPRS Roaming Exchange (GRX);
Serving GPRS Service Node (SGSN);
Global Title (SS7 parlance) (GT);
Home Location Register (HLR);
Intelligent Network (IN);
Intelligent Network Application Part (INAP);
Inter Operator SMS within HPMN (IOSMS);
International Roaming Expert Group (IREG);
ISDN User Part message from SS7 stack (ISUP);
Interactive Voice Response (IVR);
Late Call Forwarding (LCF);
Message Application Part (from GSM 09.02 GSM Standards) (MAP);
Mobile Global Title (derived from IMSI) (MGT);
Mobile Station Roaming Number (MSRN);
Originally Called Number (OCN) (same as ODN);
Originally Dialed Number (ODN) (same as OCN);
Outreach Messaging (Enhanced version of legacy SMS Welcome) (OM);
Optimized Routing (OR);
Packet Data Protocol (PDP);
Provide Roaming Number MAP message (PRN);
Service Control Point (SCP);
Signal Control Connection Part (SCCP);
Send Routing Information MAP message (SRI);
Short Message Service (SMS);
Short Message Service Center (SMSC);
SMSC in HPMN (SMSC-H);
SMSC in APMN (where APMN is not HPMN or FPMN) (SMSC-A);
SMSC in FPMN (SMSC-F);
Transfer Accounting Procedure (TAP);
Transfer Accounting Data Interchange Group (TADIG);
Transaction Capability Part (TCAP);
Translation Type (SS7 parlance) (TT);
Virtual Home Environment (VHE);
Visited Location Register (VLR);
Serving VLR in HPMN (VLR-H);
Serving VLR in FPMN (VLR-F);
Serving VLR in VPMN (VPMN is not HPMN/FPMN) (VLR-V);
Visited Public Mobile Network (other than HPMN or FPMN) (VPMN);
Wireless Fidelity (WiFi);
Basic Call State Model (BCSM);
Customized Applications for Mobile network Enhanced Logic (CAMEL);
Camel related message from SCF to SSF (Connect, Continue);
Detection Point (DP);
Deflected To Number (DTN);
Dialled Services CAMEL Subscription Information (D-CSI);
Event Detection Point (EDP);
Gateway MLC (GMLC);
GPRS Service Switching Function (gprsSSF);
GPRS CAMEL Subscription Information (GPRS-CSI);
GSM Service Control Function (gsmSCF);
GSM Specialised Resource Function (gsmSRF);
GSM Service Switching Function (gsmSSF);
Home PLMN (HPLMN);
InitialDP (IDP);
Information Element (IE);
Information Flow (IF);
Intelligent Peripheral (IP);
Interrogating PLMN (IPLMN);
Location Services (LCS);
Localised Service Area (LSA);
Mobility Management event Notification CAMEL Subscription Information (M-CSI);
Mobile Forwarding (MF);
Mobile Location Center (MLC);
Mobile Originating (MO);
Mobile Terminating in GMSC (MT);
Network CAMEL Service Information (N-CSI);
North American (NA);
Network Node Interface (NNI);

Originating Basic Call State Model (O-BCSM);
Originating CAMEL Subscription Information (O-CSI);
Operator Determined Barring (ODB);
Operator Specific Service (OSS);
Packet Data Protocol (PDP);
Point In Call (PIC);
Public Land Mobile Network (PLMN);
Serving GPRS Support Node (SGSN);
Service Logic Program Instance (SLPI);
Service Management Function (SMF);
Serving MLC (SMLC);
Short Message Service CAMEL Subscription Information (SMS-CSI);
Supplementary Service Notification CAMEL Subscription Information (SS-CSI);
Terminating Basic Call State Model (T-BCSM);
Terminating CAMEL Subscription Information (in the GMSC) (T-CSI);
Trigger Detection Point (TDP);
Transfer Protocol Data Unit (TPDU);
Translation Information Flag (TIF-CSI);
USSD CAMEL Subscription Information (U-CSI);
USSD General CAMEL Service Information (UG-CSI);
User Network Interface (UNI);
Visited PLMN (VPLMN);
Mobile Terminating in VMSC (VT);
VMSC Terminating CAMEL Subscription Information (VT-CSI);
Charging data collection interface between a CDR transmitting unit (e.g. an SGSN or a GGSN) and a CDR receiving functionality (a CGF) (Ga);
Interface between an SGSN and a BSS (Gb);
Interface between a GGSN and an HLR (Gc);
Interface between an SMS-GMSC and an SGSN, and between an SMS-IWMSC and an SGSN (Gd);
Interface between an SGSN and an EIR (Gf);
Reference point between GPRS and a packet data network (Gi);
Interface between two GSNs within the same PLMN (Gn);
Interface between two GSNs in different PLMNs (Gp) (the Gp interface allows support of GPRS network services across areas served by the co-operating GPRS PLMNs);
Interface between an SGSN and an HLR (Gr);
Interface between an SGSN and an MSC/VLR (Gs);
Interface between the RNS and the core network (Iu) (also considered as a reference point);
Kilobits per second (kbit/s);
Megabits per second (Mbit/s) (1 Mbit/s=1 million bits per second);
Reference point between a non-ISDN compatible TE and MT (typically this reference point supports a standard serial interface) (R);
The service area for which the location of an MS is reported (Reporting Area);
The location accuracy level needed for service management purposes in the 3G-SGSN, e.g. a routeing area or a cell (the 3G-SGSN can request the SRNC to report: i) the MS's current service area; ii) when the MS moves into a given service area; or iii) when the MS moves out of a given service area) (Service Area);
Interface between the mobile station (MS) and the A/Gb mode network. The Um interface is the MS to network interface for providing GPRS services over the radio to the MS (Um);
Interface between the mobile station (MS) and the Iu mode network. The Uu interface is the Iu mode network interface for providing GPRS services over the radio to the MS (Uu).

BACKGROUND

Traditionally, there are certain requirements for establishing a roaming relationship between two wireless communication network operators. These requirements include, network connectivity (for example, SS7 and/or Internet Protocol (IP)), a procedure for exchanging billing information, and a commercial roaming agreement (such as AA12-14 or AA31). These requirements must be met before International Roaming Expert Group (IREG) and Transferred Account Data Interchange Group ("TADIG") tests can be applied. With reference to FIG. 1, a traditional roaming scenario 100 is illustrated. An operator A 102 has an International Roaming Agreement 104 with an operator B 103. The operator A 102 has a fixed network 106A, a GSM system 108A, including a Visited Location Register (VLR) and a Home Location Register (HLR), an EDP center 110A, a billing system 112A, and finance software and hardware 114A. The operator B 103 has a fixed network 106B, a GSM system 108B, including a Visited Location Register (VLR) and a Home Location Register (HLR), an EDP center 10B, a billing system 112B, and finance software and hardware 114B. A subscriber 118 is a subscriber of operator B, but is roaming on the network of operator A. A subscriber 116 is a subscriber of operator A, but is roaming on the network of operator B.

As shown, the operators A and B communicate according to IREG and TADIG tests.

In voice roaming, network connectivity is established by International Switch Center (ISC) carriers or by direct connection. However, connectivity is generally the easiest part of establishing roaming. The more time time-consuming and/or difficult part is establishing a commercial agreement between the two operators before IREG and TADIG testing can proceed. Often, it is not a high priority for network operators to deal with smaller operators to set up roaming relationships. In addition, often it is not a high priority for network operators to set up roaming relationships with other operators in countries where the network operator already has at least one existing roaming relationship.

One approach to facilitating roaming is to piggyback on previously established roaming relationships, or partnerships. The partner operator is often called the sponsoring operator, and the piggybacking operator is often called the sponsored operator.

All current solutions that allow a sponsored operator to piggyback on the roaming relationships of a sponsoring operator only work for voice and Short Message Service (SMS) roaming. In these solutions, Message Application Part (MAP) signaling between the sponsored operator and the targeting roaming partner are relayed through a signal gateway that "fools" the targeting roaming partner into think it is dealing with the sponsoring network. For outbound roamers of the sponsored operator, a sponsoring operator IMSI is used in a dual IMSI SIM when roaming so the IMSI-Sponsoring is being replaced by the corresponding IMSI-Sponsored when the MAP signal is relayed through the signal gateway. The MAP signaling relay can also control MT-calls to inbound roamers from a target roaming partner to be routed through the sponsoring operator if desired.

While these prior solutions can be extended to deal with CAMEL and GPRS MAP signaling, no existing solutions allow a sponsored operator to piggyback on a sponsoring operator's GPRS roaming relationships. GPRS roaming involves both signaling and data sessions.

BRIEF DESCRIPTION OF THE DRAWINGS

Embodiments of the invention are described with the aid of the drawings, which are not intended to be limiting. In the drawings, similar reference numbers identify similar elements or acts.

FIG. 2 is a block diagram showing subsystems of one embodiment of a signal processing component.

FIG. 3 is block diagram of an embodiment of a GPRS roaming scenario.

FIG. 4 is a block diagram showing an embodiment for an inbound roamer (for example, an orange UK inbound roamer).

DETAILED DESCRIPTION

Figure 1:
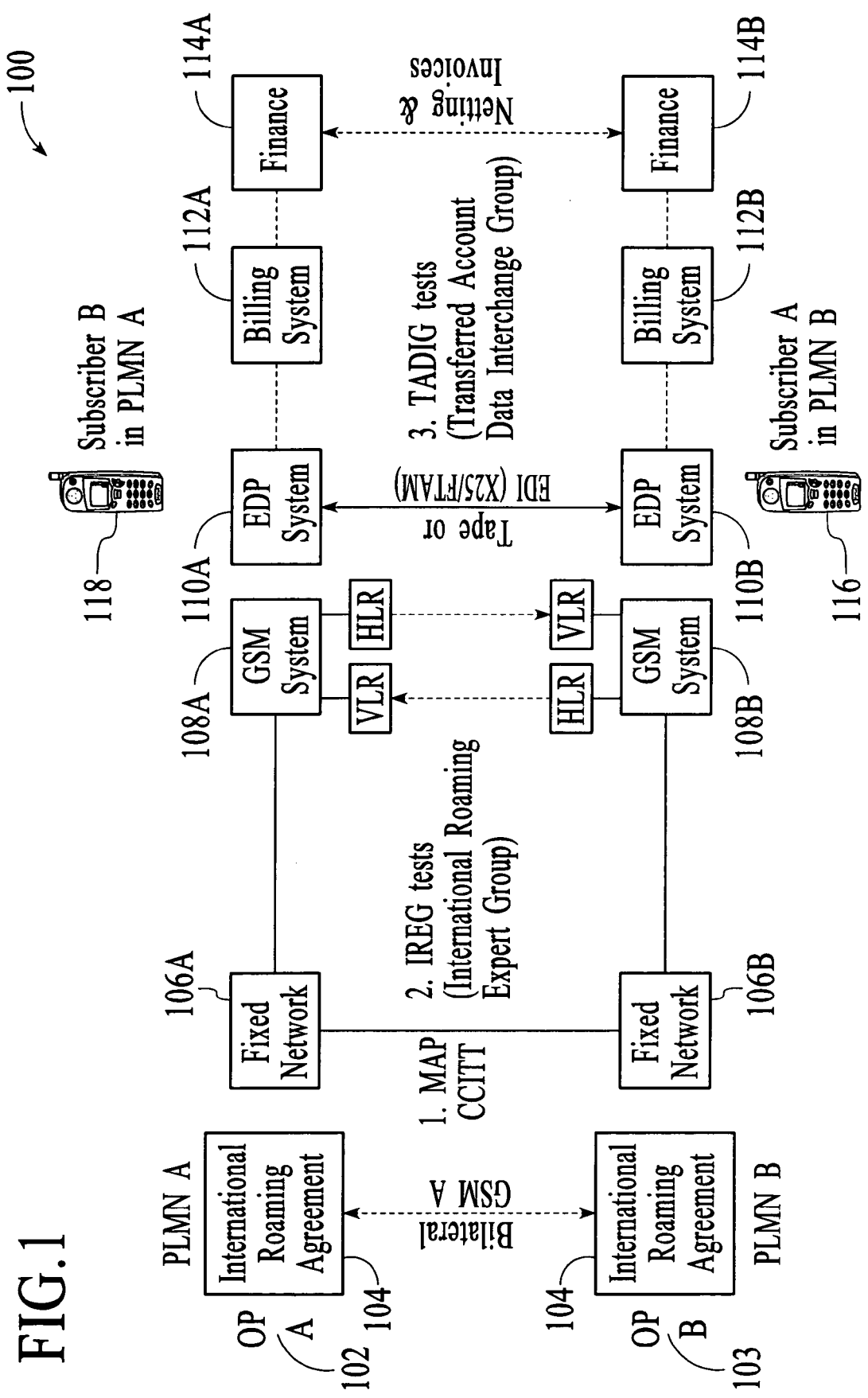
FIG. 1 is a block diagram illustrating a traditional roaming scenario.

Embodiments of an enhanced signal gateway, or Signaling Packet Relay System (SPRS), that accommodates General Packet Radio Service (GPRS) are described. In contrast to pure voice roaming solutions in which only signaling is relayed, the SPRS system also relays Packet Data Protocol (PDP) packets for GPRS. Unlike voice calls, data sessions also carry information about the IMSI, so the IMSI of a sponsoring operator must be mapped to that of the sponsored operator. As an illustration, if operator A has a GPRS roaming relationship with operator B, and operator B has GPRS capability described herein, then operator A will have virtual GPRS roaming relationships with any operator C with which operator B has a roaming relationship. An advantage of the described approach is that it allows virtual roaming between two roaming GPRS operators (who are not related by a roaming agreement) by piggybacking on a middleman operator who has roaming relationship with both operators. A data session is relayed thru a GPRS-enhanced signal gateway to "fool" the targeting roaming partner's GPRS network into thinking that it is transferring data with the sponsoring operator's GPRS network.

With reference to FIG. 2, a GPRS roaming scenario 200 according to one embodiment is illustrated. An operator A 202 has an International Roaming Agreement 204 with an operator B 203. The operator A 202 has a fixed network 206A, a GSM system 208A, including a Visited Location Register (VLR) and a Home Location Register (HLR), an EDP center 210A, a billing system 112A, and finance software and hardware 214A. The operator B 203 has a fixed network 206B, a GSM system 208B, including a Visited Location Register (VLR) and a Home Location Register (HLR), an EDP center 210B, a billing system 212B, and finance software and hardware 214B. A subscriber 218 is a subscriber of operator B, but is roaming on the network of operator A. A subscriber 216 is a subscriber of operator A, but is roaming on the network of operator B. The scenario 200 further includes a GPRS Roaming Exchange (GRX) 222 that provides a GPRA connection between the appropriate hardware and software 220A of operator A and corresponding hardware and software 220B of operator B.

GPRS roaming involves both SS7 connectivity and IP connectivity. Accordingly, both voice and data roaming will be used to illustrate various embodiments. For purposes of illustrating various embodiments, two network operators, SmarTone Macau and SmarTone HK will be used in examples. SmarTone Macau is a relatively new GSM operator in Macau. It could take SmarTone Macau a long time to negotiate with other international GSM operators for roaming agreements. To solve this example problem, an embodiment of a Signal and Packet Relay System (SPRS) is deployed SmarTone Macau or in SmarTone HK/Macau. Using this SPRS node, SmarTone Macau can piggyback on the roaming relationships of SmarTone HK to offer outbound roamers immediate roam services around the world. Just as importantly, SmarTone Macau can offer service to inbound roamers to Macua from all over the world.

Descriptions of embodiments of the SPRS follow, including examples of logistics, signal flows, and billing strategies. The embodiments support both inbound and outbound communications from a network signaling perspective, although there may be additional logistics involved with outbound roaming support (for example, with respect to SIMs and billing).

According to various embodiment, a broad strategy for SPRS with GPRS, using SmarTone Macau and SmarTone HK as example operators, is as follows. When a SmarTone Macau subscriber roams in an example billing framework for outbound roamers from a United Kingdom (UK) network, or any other network except SmarTone HK, the UK network is made to think that they are a SmarTone HK subscriber and not a SmarTone Macau subscriber.

When an Orange UK subscriber roams in SmarTone Macau, the UK network must be made to think that it is roaming in SmarTone HK. The SmarTone Macau network need not be made to think that the subscriber is from SmarTone HK.

When a SmarTone Macau subscriber roams in SmarTone HK, or in operators who already have a roaming relationship with SmarTone Macau, they appear as a SmarTone Macau subscriber (which is a normal roaming scenario). Thus SmarTone HK or the roaming partners are treated as a special case, or an exception to the rule that a roaming SmarTone Macau subscriber appears as a SmarTone HK subscriber whenever they roam outside SmarTone Macau.

In this broad strategy, all MAP messages from SmarTone Macau to UK are trapped, and transformed to look to the UK as if they are coming from SmarTone HK. Messages From the UK that seem to be addressed to SmarTone HK, but are actually for SmarTone Macau are identified and transformed so that they get routed to the appropriate network (e.g. SmarTone Macau).

For data roaming, all GPRS session messages are trapped, and the sponsoring IMSI is replaced by the sponsored IMSI. This is accomplished by acting as a proxy to relay GPRS packets over two tunnels. One tunnel is between UK and SPRS at the sponsoring operator and the other tunnel is between SPRS and the sponsored operator SmarTone Macau.

According to the broad strategy, one embodiment is a solution in which aSPRS node is introduced into a SmarTone HK/Macau network. In one embodiment, this is an SS7/MAP node with full SCCP capability (e,g, Global Title Translation and Routing). All international roaming messages with outbound roamers and inbound roamers from networks with no roaming relationship with SmarTone Macau (non-roaming partners) are routed via the SPRS.

Signal Transfer Point (STP) tables in the SmarTone HK are used to route all messages from non-roaming partners of SmarTone Macau to the new signaling node. The STP tables in SmarTone Macau are configured to route all messages from SmarTone Macau to the new signaling node. The signaling node modifies the messages as appropriate, and sends them out through a GMSC.

For data roaming, the SPRS node supports a Gp interface. The SPRS node can establish PDP context with both UK and the SmarTone Macau GGSN/SGSN, and relay PDP packets between the two tunnels.

FIG. 3 is a block diagram illustrating an embodiment 300 for an inbound roamer 302 (for example, an orange UK inbound roamer). The embodiment 300 includes an SGSN 304, and a VLR 306 for SmarTone Macau. SmarTone HK includes an SPRS signal gateway 310. Orange UK includes a GGSN 312 and an HLR 314. There are two PDP tunnels accomplished by a GRX 308A between SmarTone Macau and SmarTone HK, and a GRX 308B between SmarTone HK and Orange UK. The VLR 306 and the SGSN 304 communicate with the SPRS 310 via an SS7 connection 316A. The SPRS 310 further communicates with the HLR 314 via an SS7 connection 316B.

The Orange UK subscriber 302 is roaming in SmarTone Macau. The SmarTone Macau VLR 306 and SGSN 304 send a location update to the UK operator. This message is directed to the SPRS signal gateway 310. This message must be modified in SmarTone HK to make it look as if it was being sent by a SmarTone HK VLR/SGSN 306/304. It is then sent to the UK HLR 314. The UK HLR 314 responds with an Insert Subscriber Data message addressed to the (fictitious) SmarTone HK VLR/SGSN 306/304. The signaling node realizes that the message is actually meant for the SmarTone Macau VLR/SGSN 306/304, modifies the relevant fields, and routes it accordingly. For data roaming, when the UK subscriber accesses an APN, the PDP tunnel 308A is established between the SmarTone Macau SGSN 304 and the SPRS 310, and the PDP tunnel 308B is also established between the SPRS 310 and the UK GGSN 312. Packets are relayed across the two tunnels.

FIG. 4 is a block diagram illustrating an embodiment 400 for an outbound roamer 402 (for example, a SmarTone Macau outbound roamer). The embodiment 400 includes an GGSN 404, and an HLR 406 for SmarTone Macau. SmarTone HK includes an SPRS signal gateway 410. Orange UK includes an SGSN 412 and a VLR 414. There are two PDP tunnels accomplished by a GRX 408A between SmarTone Macau and SmarTone HK, and a GRX 408B between SmarTone HK and Orange UK. The VLR 414 and the SGSN 412 communicate with the SPRS 410 via an SS7 connection 416B. The SPRS 410 further communicates with the HLR 406 via an SS7 connection 416A.

The SmarTone Macau subscriber 402 is roaming in Orange UK using a dual IMSI SIM. Orange UK will see the SmarTone HK IMSI because it has a roaming relationship with SmarTone HK. The subscriber 402 must (manually or automatically) select the SmarTone HK IMSI profile in the SIM to register with Orange UK. SmarTone HK relays the message through the SPRS 410 to transform the message for sending on to the SmarTone Macau network elements. The SmarTone Macau HLR 406 sees the SmarTone Macau IMSI as an IMSI provisioned in the HLR 406.

For data roaming, when the SmarTone Macau subscriber 402 accesses an APN, the PDP tunnel 408A is established between the SmarTone Macau GGSN 404 and the SPRS 410. The PDP tunnel 408B is established between the SPRS 410 and the Orange UK SGSN 412. Packets are relayed across the two tunnels.

If the subscriber 402 roams in SmarTone HK or SmarTone Macau, or operators that already have a roaming relationship with SmarTone Macau, using the SmarTone HK IMSI, the signaling relay rejects the registration request.

It is possible that SmarTone Macau has a voice roaming relationship with operator X but not a GPRS roaming relationship). In this case, whether an "update location request" is rejected depends on whether it is a VLR update location, or as SGSN update location request. In both cases, SmarTone HK will direct any update location with the specific IMSI range to the SPRS 410. If it is a GPRS request, and if there is no GPRS roaming relationship, then it is processed normally, otherwise, it is rejected. If it is a VLR request, and if there is no voice roaming relationship, then it is processed normally, otherwise, it is rejected.

There are logistics associated with inbound roaming support. There are additional logistics associated with outbound roaming support. Some aspects of these logistics are described below.

Dual IMSI or Special Single IMSI SIM for Outbound Roamers

To enable SmarTone Macau subscribers to roam in foreign networks that do not have a roaming relationships with SmarTone Macau, but have a roaming relationship with SmarTone HK, the subscribers are provided a dual-IMSI SIM card. One IMSI is a SmarTone Macau IMSI, while the other is a SmarTone HK IMSI. The SmarTone HK IMSI is related to the SmarTone Macau IMSI in the following manner:

SmarTone Macau IMSI: 455-00-12345 (provisioned in SmarTone Macau HLR)

SmarTone HK IMSI: 454-06-09-12345 (not provisioned in/recognized by any HLR)

Here SmarTone HK allocates a special range of IMSIs indicated by "09" for the SmarTone Macau outbound roamers. "09" is just an example. SmarTone HK is free to use any prefixes for this purpose. It is possible in other embodiments to use a table to map a special SmarTone HK IMSI with a SmarTone Macau IMSI. This approach involves database access.

Orange UK (an example network) sees the SmarTone HK IMSI because it has a roaming relationship with SmarTone HK. SmarTone Macau HLR sees the SmarTone Macau IMSI because that is the one provisioned in the HLR.

If the subscriber roams in SmarTone HK or operators that already have a roaming relationship with SmarTone Macau, or SmarTone Macau with the SmarTone HK IMSI, the signaling relay node rejects the registration request.

For outbound data roaming, SmarTone HK assigns some fictitious SmarTone HK APNs that correspond to the real APNs of SmarTone Macau. In this way, when the SmarTone Macau outbound roamers are in the UK network, the fictitious SmarTone HK APN is chosen in order to access the real APN of SmarTone Macau.

For inbound data roaming, SmarTone Macau arranges with its GRX provider or DNS server for any APN of an operator that does not have a data roaming relationship with SmarTone Macau to return the SPRS as the GGSN.

Under the profile of the SmarTone HK IMSI in the dual IMSI SIM, the SMSC address is a specially assigned SmarTone HK E164 number corresponding to a SmarTone Macau SMSC address. However APNs are generally not on the SIM; they can be created or transmitted over the air (OTA'd) to the handset.

All security related functions and parameters of SmarTone Macau remain as before. In particular, authentication is done using SmarTone Macau's HLR, regardless of the IMSI profile selected.

The SPRS also supports a special single IMSI SIM set up without any change to the SPRS node. The SIM only contains the specially allocated SmarTone HK-IMSI and its associated profile (e.g. a SmarTone HK SMSC address that corresponds to a SmarTone Macau SMSC). The subscriber thus obtains a new SIM. This approach simplifies the user interface for subscribers and may be more cost-effective on the SIM side. However on the network side there are still two IMSIs, and they are related in the same way as previously described. The signaling flow also remains the same. The Single vs Dual IMSI SIM decision is typically made by the smaller network, e.g., SmarTone Macau in our examples. If SmarTone Macau uses the Single IMSI SIM approach, SmarTone Macau will configure its SCCP/GTT routing on the special SmarTone HK IMSI through the SPRS node even though the SmarTone Macau subscriber is in Macau. In addition, SmarTone Macau must modifies its billing process to recognize that CDRs generated for a special range of SmarTone HK IMSIs are actually from its own subscribers.

Dual IMSI SIM or special Single IMSI SIM as described is not a requirement for supporting inbound roamers who register with the SmarTone Macau network. However, according to our examples, SmarTone Macau is a relatively smaller network that can expect more inbound, visiting roamers than outbound, subscriber roamers. The architecture and the signaling node are the same in either case, and services to inbound and outbound roamers can be implemented incrementally or all at once. The only difference is that in one instance (for outbound roamers) a dual IMSI or a special Single IMSI SIM is issued. All SIM related functions (e.g. manually or automatically select a profile, network IMSI mapping, SMSC addresses) are worked out by SmarTone Macau and SmarTone HK.

Billing Issues

Whether for inbound roamers or outbound roamers, TAP files and invoices are exchanged between the foreign network and SmarTone HK, for example through a clearing house. All billing related issues are worked out by SmarTone HK and SmarTone Macau (as example operators).

SS7 Routing Options

The SPRS may be physically located in SmarTone Macau, or in SmarTone HK, or in both networks depending on the routing options adopted.

There are several routing options, and the choice might depend on the various network environments. Some options are technically simpler but logistically more challenging, and hence potentially more costly. Other options are technically more complex but logistically simpler. Various SS7 routing options are described below.

Translation Type

Figure 5:
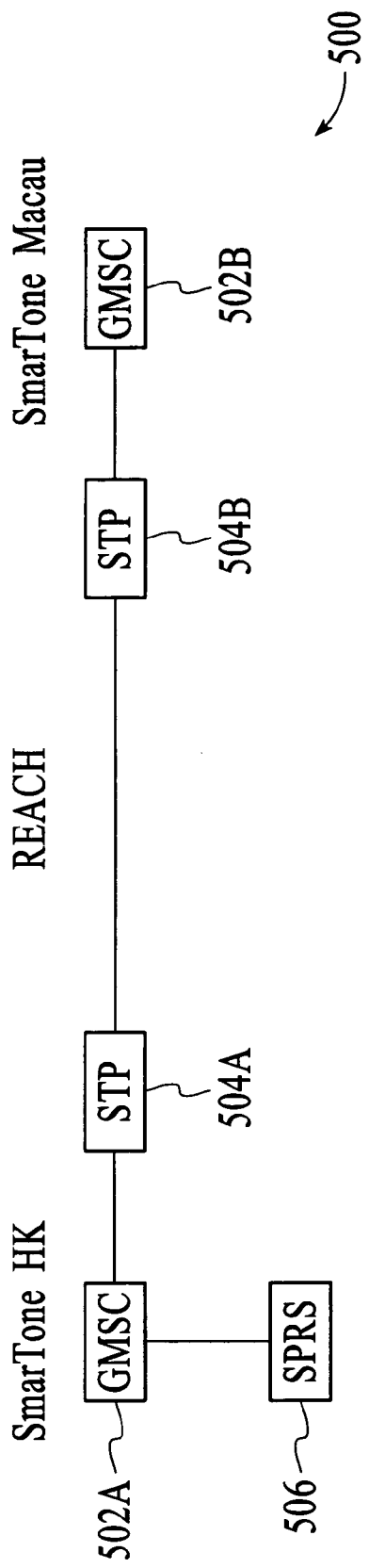
FIG. 5 is a block diagram showing an embodiment for an outbound roamer.

Translation type is one SS7 routing option. In this option, with reference to FIG. 5, SmarTone Macau and SmarTone HK each have translation type support. SmarTone Macau includes a GMSC 502A and an SPRS 506. SmarTone HK includes a GMSC 502B. An STP 504A and an STP 504B are situated as shown. An existing ISC carrier, for example REACH, also dedicates a translation type (e.g. 31) for this service. The SPRS node is physically located in SmarTone HK, which is responsible for assigning a SPC (Signal Point Code) to the SPRS node. SmarTone HK assigns a pool of SmarTone HK-GTs to the SPRS node. The size of the pool is the same as the number of HLRs and SMSCs in SmarTone Macau.

The SmarTone Macau-GMSC is configured in its GTT in such a way that all CdPA destined for international GTs (GTs that have no roaming relationships with SmarTone Macau) are routed through the REACH STP without changing the routing indicator. That is, they are still routing on the GT. The GTT function introduces the specially agreed upon translation type (e.g. 31). The REACH GTT is configured in such a way that, for a SCCP message of the special translation type (e.g. 31), it routes the SCCP message to the SmarTone HK GMSC. The SmarTone HK-GMSC is configured in its GTT in such a way that all GTs with the special translation type (e.g. 31) re mapped to the SPRS SPC.

The SPRS node modifies the Calling GT, and possibly other MAP parameters (e.g., IMSI) to a specially assigned SmarTone HK GT that corresponds to the calling GT. The mapping can be statically defined at the SPRS and dynamically created at the time of assignment. The former may be more advisable, because if the dynamic mapping is corrupted in the latter approach, reset and restoration procedures must be performed.

The SPRS node retains a routing indicator on the GT. When receiving a message with the special translation type, the SPRS modifies the CgPA to its corresponding SmarTone HK GT and sends the message to the SmarTone HK GMSC with translation type 0. When receiving a message including the CdPA with the special SmarTone HK GT assigned for SmarTone Macau, the SPRS modifies the CdPA (e.g. SmarTone HK-MGT, SmarTone HK-GT-FOR-SmarTone Macau-HLR, SmarTone HK-GT-FOR-SmarTone Macau-SMSC etc) to its corresponding SmarTone Macau GT (e.g. SmarTone Macau-MGT, SmarTone Macau-HLR, SmarTone Macau-SMSC) and send the message to the SmarTone HK GMSC.

One advantage of this approach include the relative simplicity of connection set up. On the other hand, to use this approach, the operators, e.g., SmarTone Macau and SmarTone HK might need to upgrade their systems to support translation type if it is not currently supported.

Private Connection

Figure 6:
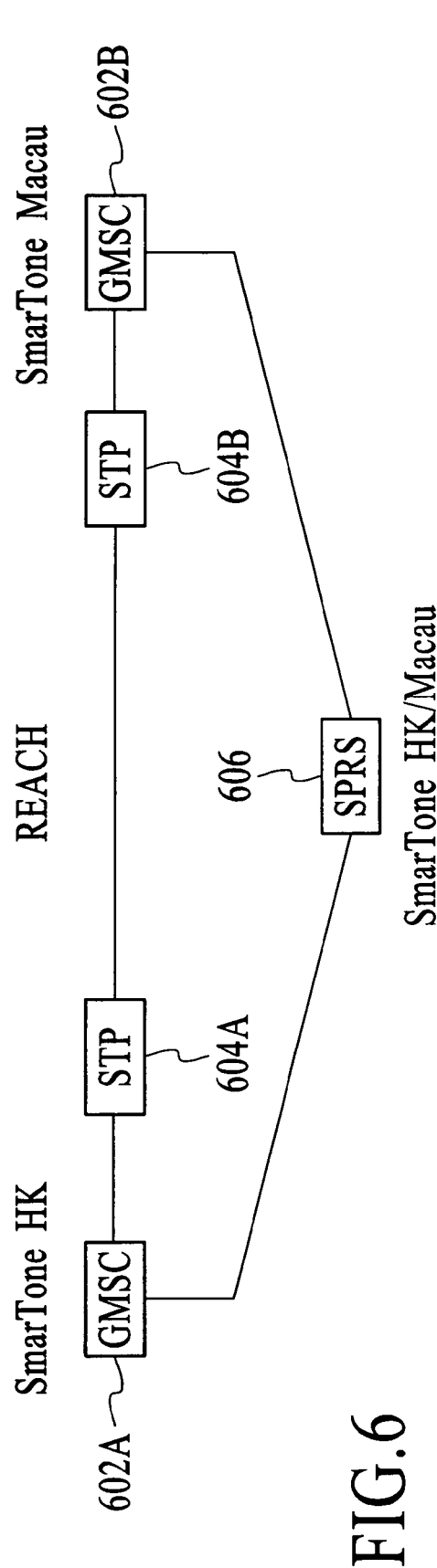
FIG. 6 is a block diagram illustrating a private connection option in which an SPRS node has a private SS7 connection.

Another option, that does not require a translation type, is a private connection option. This option is illustrated in FIG. 6 as an embodiment 600 in which an SPRS node 606 has a private SS7 connection to both a SmarTone HK GMSC 602B, and a SmarTone Macau GMSC 602A. The private connection can be a leased line from an IPLC provider. The embodiment further includes an STP 604A and an STP 604B.

The SPRS node 606 can be physically located in SmarTone HK or SmarTone Macau. If the node is located in SmarTone Macau, it will allow SmarTone Macau to maintain and control the node and extend it for future use (e.g. piggybacking an alternative operator for roaming extension) on the same node. However depending on available resources, it might be better to locate the node in SmarTone HK. No matter where the SPRS node is located, there are two SPCs associated with the node. One SPC is in the SPC space of Hong Kong and the other SPC is in the SPC space of Macau.

SmarTone HK assigns a pool of SmarTone HK-GTs to the SPRS node. The size of the pool is the same as the number of HLRs and SMSCs in SmarTone Macau. SmarTone Macau-GMSC is configured in its GTT in such a way that all CdPA destined for international Gts (that have no roaming relationships with SmarTone Macau) are routed through the SPRS without changing the routing indicator (that is, still routing on GT).

SmarTone HK-GMSC configures its GTT in such a way that all CdPA destined for all the SmarTone HK-GTs assigned to the SPRS and all CdPA/MGT in the special range of IMSI (e.g. 454-06-09-x) assigned to SmarTone Macau are routed through the PRS without changing the routing indicator (that is, still routing on GT).

The SPRS node retains the routing indicator on the GT. When receiving a message from the SmarTone Macau side, the SPRS modifies the CgPA to its corresponding SmarTone HK GT, and send the message to the SmarTone HK GMSC. When receiving a message from the SmarTone HK side, the SPRS modifies the CdPA (e.g. SmarTone HK-MGT, SmarTone HK-GT-FOR-SmarTone Macau-HLR, SmarTone HK-GT-FOR-SmarTone Macau-SMSC etc) to its corresponding SmarTone Macau GT (e.g. SmarTone Macau-MGT, SmarTone Macau-HLR, SmarTone Macau-SMSC) and sends the message to the SmarTone Macau GMSC.

An advantage of this approach is that there is no requirement for a translation type, and there is no need to negotiate with REACH for special routing. However there might be a need to involve another IPLC provider to interconnect the SPRS node to both SmarTone HK and Macau networks.

Global Title Modification

Figure 7:
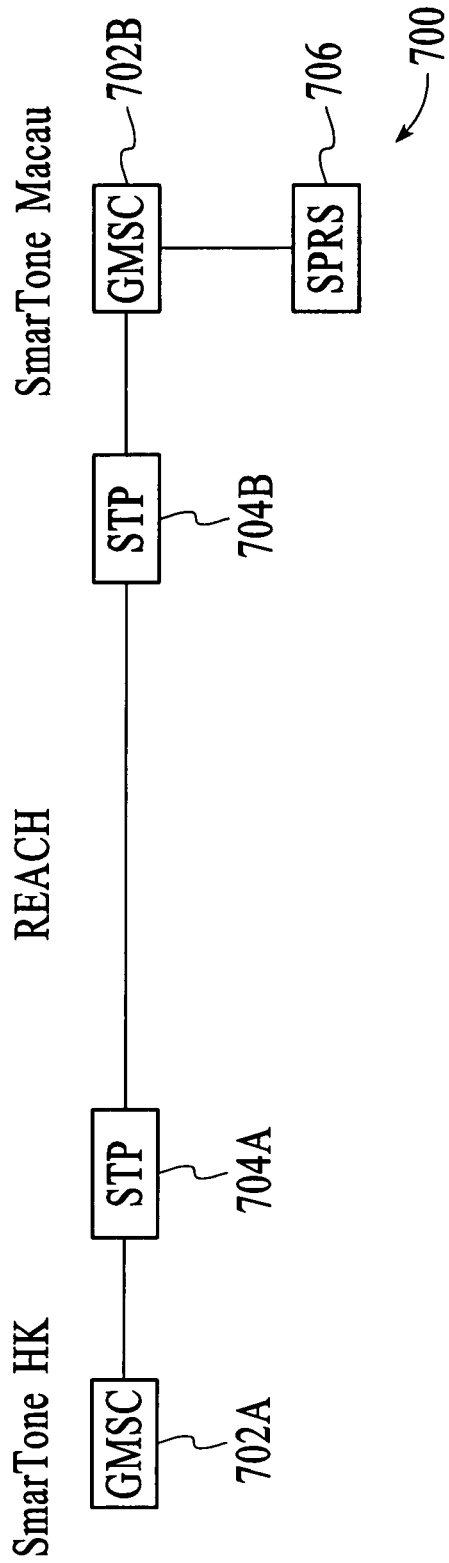
FIG. 7 is a block diagram illustrating a configuration for a global title modification option and a Mobile Number Portability (MNP) option, which modifies the called address by prefixing it with a routing number.

In this option, with reference to FIG. 7, SmarTone Macau and SmarTone HK have global title modification support. The SPRS node 706 is physically located in SmarTone Macau, which is responsible for assigning a SPC (Signal Point Code) to the SPRS node 706. This allows SmarTone Macau to maintain and control the SPRS node and extend it for future use (e.g. piggybacking an alternative operator for roaming extension).

SmarTone HK assigns a pool of SmarTone HK-GTs to the SPRS node 706. The size of the pool is the same as the number of HLRs and SMSCs in SmarTone Macau. The SmarTone Macau GMSC 702B is configured in its GTT in such a way that all CdPA destined for international GTs are routed through the SPRS 706 without changing the routing indicator (that is, still routing on GT).

The SmarTone HK GMSC702A is configured in its GTT in such a way that all CdPA destined for all the SmarTone HK-GTs assigned to the SPRS, and all CdPA/MGT in the special range of IMSI (e.g. 454-06-09-x) assigned to SmarTone Macau, are modified to the corresponding SmarTone Macau GTs without changing the routing indicator (that is, still routing on GT). Here, the SmarTone HK GMSC 702A supports global title modification. The SPRS node 706 retains the routing indicator on GT. To avoid looping, the SmarTone Macau GMSC 702B also has the capability of looking at CgPA GT for translation first. For any SCCP messages with a CgPA as a SmarTone HK GT, the SmarTone Macau GMSC 702B routes the message through REACH, e.g, through STPs 704.

When a SCCP message does not have a CgPA of SmarTone HK, and has a CdPA as an international GT that has no roaming relationship with SmarTone Macau, the SmarTone Macau GMSC routes the message to the SPRS 706. The SPRS 706 modifies the CgPA to its corresponding SmarTone HK GT, possibly modifying MAP parameters, and sends the message back to the SmarTone Macau GMSC 702B.

Alternatively, SmarTone Macau has local translation type support. For any international CdPA GT that does not have a roaming relationship with SmarTone Macau, and the translation type is 0, SmarTone Macau GMSC will route the message to the SPRS 706. The SPRS 706 modifies the calling GT, possibly the MAP parameters, and sends the message back to the SmarTone Macau GMSC 702B with a previously agreed non-zero translation type (e.g. 31). SmarTone Macau GMSC 702B configures its GTT to route the message to the REACH STP 704 with translation type 0, without changing the routing indicator.

In both alternatives, it is assumed REACH will not reject SCCP messages with CgPA GTs from those of SmarTone HK on entering the REACH STP that connects to the Macau side.

An advantage of this approach is it relatively simple connection, and the fact that no private connection is needed. The GT modification support is provided by the SmarTone HK switch. Other support provided by the SmarTone Macau switch is local translation type support, or GTT support for CgPA with preference over CdPA. It is assumed that REACH does not block messages with a SmarTone HK GT entering its Macau side STP.

GT Prefix

This approach is based on Mobile Number Portability (MNP), which modifies the called address by prefixing it with a routing number. This option is also appropriate for the embodiment 700 of FIG. 7. SmarTone HK assigns a pool of SmarTone HK-GTs to the SPRS node 706. The size of the pool is the same as the number of HLRs and SMSCs in SmarTone Macau. The SmarTone Macau-GMSC 702B is configured in its GTT in such a way that all CdPA destined for international GTs are routed through the SPRS 706 without changing the routing indicator (that is, still routing on GT).

The SmarTone HK-GMSC 702A is configured in its GTT in such a way that all CdPA destined for all the SmarTone HK-GTs assigned to the SPRS 706, and all CdPA/MGT in the special range of IMSI (e.g. 454-06-09-x) assigned to SmarTone Macau, are modified to the corresponding SmarTone Macau GTs without changing the routing indicator (that is, still routing on GT). Here the SmarTone HK GMSC 702A supports global title modification.

The GTT modification on MGT (e.g. 454-06-09-X) also include a special range indicator (e.g., 09 as before, or something different). For example, 454-06-09-X=>455-00-09-X. The SmarTone Macau GMSC 702B is configured to route the special (455-00-09-X) IMSI range through the SPRS node 706. The SPRS 706 strips the "09" and modifies the MAP parameters if necessary. The special IMSI range 455-00-09 is not provisioned at the SmarTone Macau HLR.

When receiving a SCCP message that has a CdPA as an international GT that has no roaming relationship with SmarTone Macau, the SmarTone Macau GMSC routes the message to the SPRS node 706. The SPRS modifies the CdPA by prefixing it with a corresponding SmarTone HK GT dedicated for the SPRS function, possibly modifying MAP parameters and sends the message back to the SmarTone Macau GMSC. To solve any possible maximum length problem, the numbering plan is changed to GENERIC. It is assumed REACH will not reject SCCP messages with numbering plan as GENERIC. To distinguish between E164 and E214/212 numbering plans, a different prefix of a SmarTone HK GT for each is used to denote the SPRS node 706.

The SmarTone HK-GMSC 702A is configured in its GTT in such a way that that the generic numbering plan-based special prefix is stripped, and the corresponding numbering plan identifier for the special prefix is assigned in the modified CdPA GT. Here again SmarTone HK GMSC 702A supports global title modification.

This approach includes relatively simple connection, and does not require negotiation with REACH, or a private connection. GT modification support is provided by the SmarTone HK switch. Local translation type support is provided by the SmarTone Macau switch, or GTT support for CgPA with preference over CdPA. Finally this approach assumes that REACH does not block messages with a SmarTone HK GT entering its Macau side STP 704B.

SPRS at both Networks

Figure 8:
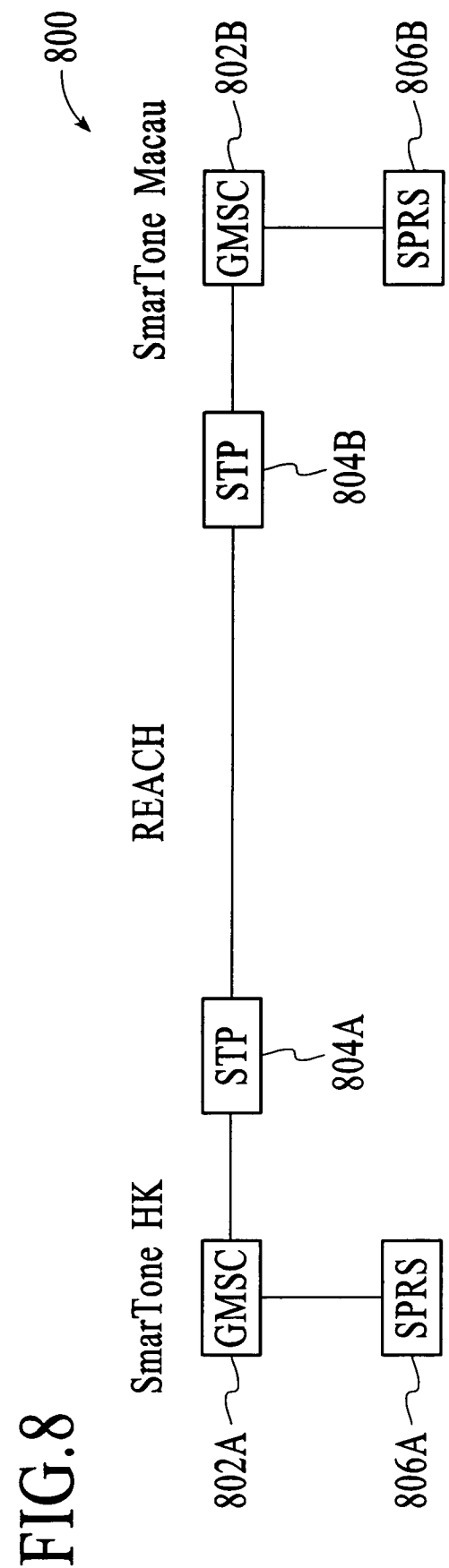
FIG. 8 is a block diagram illustrating a configuration in which there is an SPRS node at each network.

In this approach, illustrated by embodiment 800 of FIG. 8, there is an SPRS node 806 in both SmarTone Macau and SmarTone HK. Each side is responsible for assigning an SPC for its SPRS node 806. SmarTone HK assigns the same pool of SmarTone HK-GTs to both SPRS nodes 8-6A and 806B. The size of the pool is the same as the number of HLRs and SMSCs in SmarTone Macau.

The SmarTone Macau-GMSC 806B is configured in its GTT in such a way that SCCP messages of all CdPA destined for international GTs that have no roaming relationships with SmarTone Macau are routed through its side of SPRS node without changing the routing indicator (that is, still routing on GT).

SmarTone HK-GMSC802A is configured in its GTT in such a way that all CdPA destined for all the SmarTone HK-GTs (for example, two GTs in one embodiment) assigned to SPRS, and all CdPA/MGT in the special range of IMSI (e.g. 454-06-09-x), assigned to SmarTone Macau are routed through its side of SPRS without changing the routing indicator (that is, still routing on GT).

Each SPRS node 806 retains the routing indicator on GT. When receiving a message from the SmarTone Macau GMSC, the Macau SPRS 806B puts the original CdPA in a private MAP IE (information element) or encapsulate the original message in a FSMS message, modifies the CdPA to its corresponding SmarTone HK GT of SPRS, and sends the message back to the SmarTone Macau GMSC 802B.

When receiving a message from the SmarTone HK GMSC 802A, the SmarTone HK SPRS 806A modifies the CdPA (e.g. SmarTone HK-MGT, SmarTone HK-GT-FOR-SmarTone Macau-HLR, SmarTone HK-GT-FOR-SmarTone Macau-SMSC) to its corresponding SmarTone Macau GT (e.g. SmarTone Macau-MGT, SmarTone Macau-HLR, SmarTone Macau-SMSC) and sends the message back to the SmarTone HK GMSC. However if the CdPA is intended for itself in the SCCP message, the SmarTone HK SPRS node 806A picks up the original CdPA from the private MAP IE or encapsulated FSMS message, and sets it as the new CdPA address of the SCCP message, possibly modifying other MAP parameters before sending back to the SmarTone HK GMSC 802A.

An advantage of this approach is it relatively simple connections and configurations. In addition, no special switch features such as TT, GT modifications etc, are needed. There is further no need for REACH or private connection. Two SPRS functions rather than one are required for this approach. However, the hardware is not that expensive, and the operators may not need pay for additional software licenses.

Detailed Scenarios

The following section lists messages that pass through the proposed SPRS node. The SPRS node can be physically located in SmarTone HK or SmarTone Macau, or in both depending on the routing options adopted as described earlier. Also described, with examples, are transformations that the SPRS node performs on the messages, for example in the addressing, and if applicable, in the application payload in some MAP messages.

In various embodiments, all inter-PLMN MAP messages are trapped, transformed and/or re-routed by the SPRS node.

For the information in this section, it is assumed that routing/translation tables at the SmarTone Macau will route all SCCP messages for international numbers of those mobile networks that do not have a roaming relationship with SmarTone Macau to the SPRS node using one of the routing options described earlier. It is also assumed that routing/translation tables at the SmarTone HK will route all SCCP messages for a special set of SmarTone HK GTs to the SPRS node which relays the messages to the real destination in SmarTone Macau network using one of the routing options described earlier.

Inbound Roamer Registration/Location Update

This section describes the messages related to registration/location update of UK subscribers roaming in SmarTone Macau. Table 1 describes a MAP_UPDATE_LOCATION message of one embodiment. Here there is a static mapping of each SmarTone Macau VLR and VMSC to a SmarTone HK GT. This mapping is maintained at the SPRS node.

TABLE 1

| Message sender/receiver | Message content | Remarks |
| --- | --- | --- |
| SmarTone Macau VLR to SmarTone Macau GMSC | SCCP Called Address:<br>Global Title: 44-181-123456<br>SSN: 6<br>SCCP Calling Address:<br>Global Title: 853-624-333333<br>SSN: 7<br>MAP level parameters:<br>IMSI: 234-15-123456<br>MSC address 853-624-444444<br>VLR number 853-624-333333 | MGT derived from IMSI<br>HLR<br><br>GT of SmarTone Macau VLR<br>VLR<br><br>IMSI of Orange UK subscriber<br>E.164 number of serving MSC<br>E.164 number of serving VLR |
| SmarTone Macau GMSC to | Same as above | Direct all GTs of any non-roaming partner of SmarTone Macau towards |

TABLE 1-continued

| Message sender/receiver | Message content | Remarks |
|---|---|---|
| SPRS | | SPRS |
| SPRS to SmarTone HK GMSC | SCCP Called Address: Global Title: 44-181-123456 SSN: 6 SCCP Calling Address: Global Title: 852-620-005469 | MGT derived from IMSI HLR SmarTone HK GT of SPRS corresponding to SmarTone Macau VLR |
| | SSN: 7 | VLR (to make UK HLR think request is coming from a SmarTone HK VLR) |
| | MAP level parameters: IMSI: 234-15-123456 MSC address 852-620-005467 VLR number 852-620-005469 | IMSI of UK subscriber Convert to a corresponding SmarTone HK address Convert to a corresponding SmarTone HK address |
| SmarTone HK GMSC to UK GMSC/HLR | Same as above | Normal Routing based on Translation Type 0 |

Table 2 describes a MAP_UPDATE_GPRS_LOCATION message of one embodiment. The registration sequence begins with the MAP_UPDATE_GPRS_LOCATION message. This message is sent by the serving SmarTone Macau SGSN to the UK HLR. Here there is a static mapping of each SmarTone Macau SGSN number and IP address to a SmarTone HK GT and address. This mapping is maintained at the SPRS node. The mapping can be dynamically created and remain static afterwards.

Table 3 describes a MAP_INSERT_SUBSCRIBER_DATA message of one embodiment. This message is sent by the UK HLR in response to the MAP_UPDATE_GPRS_LOCATION or MAP_UPDATE_LOCATION request received from the SmarTone Macau VLR/SGSN (which the UK HLR thinks was sent by a SmarTone HK VLR/SGSN). The role of SPRS for this message is to identify that this message needs to go to the SmarTone Macau VLR/SGSN, and to route it

TABLE 2

| Message sender/receiver | Message content | Remarks |
|---|---|---|
| SmarTone Macau SGSN to SmarTone Macau GMSC | SCCP Called Address: Global Title: 44-181-123456 SSN: 6 SCCP Calling Address: Global Title: 853-624-333333 SSN: 95 MAP level parameters: IMSI: 234-15-123456 SGSN address TLV-IP-Macau SGSN number 853-624-333333 | MGT derived from IMSI HLR GT of SmarTone Macau SGSN SGSN hex IMSI of Orange UK subscriber Type, length, Ipv4/v6 address E.164 number of SGSN |
| SmarTone Macau GMSC to SPRS | Same as above | Direct all GTs of any non-roaming partner of SmarTone Macau towards SPRS |
| SPRS to SmarTone HK GMSC | SCCP Called Address: Global Title: 44-181-123456 SSN: 6 SCCP Calling Address: Global Title: 852-620-005469 | MGT derived from IMSI HLR SmarTone HK GT of SPRS corresponding to SmarTone Macau SGSN |
| | SSN: 95 | SGSN (to make UK HLR think request is coming from a SmarTone HK SGSN) |
| | MAP level parameters: IMSI: 234-15-123456 SGSN address TLV-IP-HK SGSN number 852-620-005469 | IMSI of UK subscriber Convert to a corresponding SmarTone HK address Convert to a corresponding SmarTone HK address |
| SmarTone HK GMSC to UK GMSC/HLR | Same as above | Normal Routing based on Translation Type 0 | accordingly by changing the SCCP parameters. SGSN and VLR are considered together in the following.

In the case of Called Address being the SGSN, each APN cannot be changed since SGSN needs that to verify if the MS is allowed to access the APN when it tries to create a PDP context with that APN. However when the ST Macau SGSN issues a DNS request on APN, the DNS server is configured to return SPRS IP address for any APN that has no entry. The SPRS has partial SGSN/GGSN functionality to support Gp interface specifically. When ST Macau SGSN tries to create a PDP context with SPRS—the first leg of tunnel, SPRS uses the APN in the create request to issue another DNS request in the domain of ST HK, which would return the UK GGSN. The SPRS then establishes a second leg of PDP context with the UK GGSN. The tunnel ID and IMSI, or charging ID, can be relayed over the legs and are used to identify the relaying forward and backward between the two legs of GTP tunnels. In this case, the SPRS then functions as a STHK GGSN to STMC SGSN, and a STHK SGSN to UK GGSN.

Table 4 describes a MAP_INSERT_SUBSCRIBER_DATA response of one embodiment. This message is sent by the SmarTone Macau VLR in response to the Insert_Subscriber_Data request sent by the UK HLR. The SPRS modifies this message such that the UK HLR thinks it is coming from a SmarTone HK VLR/SGSN.

TABLE 4

| Message sender/receiver | Message content | Remarks |
| --- | --- | --- |
| SmarTone Macau GMSC to SPRS | SCCP Called Address:<br>Global Title: 44-181-444444<br><br>SSN: 6<br>SCCP Calling Address:<br>Global Title: 853-624-333333<br>SSN: 7/95<br>MAP level parameters: None. | This time, the MGT is not derived from IMSI but from the SCCP Calling Address in the insert_sub_data msg<br>HLR<br><br>GT of SmarTone Macau VLR/SGSN<br>VLR/SGSN |

TABLE 3

| Message sender/receiver | Message content | Remarks |
| --- | --- | --- |
| UK HLR/GMSC to SmarTone HK GMSC | SCCP Called Address:<br>Global Title: 852-620-005469<br><br>SSN: 7/95<br><br>SCCP Calling Address:<br>Global Title: 44-181-444444<br>SSN: 6<br>MAP level parameters:<br>IMSI: 234-15-123456<br>MSISDN 44-181-654321<br><br><br><br><br>UK GPRS subscription data, using PDP context including type, address, APN Uk-apn.uk.gprs | SmarTone HK GT of SPRS corresponding to SmarTone Macau VLR/SGSN<br>VLR/SGSN<br><br><br>GT of UK HLR<br>HLR<br><br>IMSI of Orange UK subscriber<br>MSISDN of UK subscriber<br>(Either IMSI or MSISDN will be present. MSISDN in case of a location update; IMSI in other cases (e.g. operator determined barring).)<br>In case of SGSN being the called address<br>UK APN |
| SmarTone HK GMSC to SPRS | Same as above | SmarTone HK GMSC routes the message to the SPRS based on the SPRS GT |
| SPRS to SmarTone Macau GMSC | SCCP Called Address:<br>Global Title: 853-624-333333<br><br><br>SSN: 7/95<br>SCCP Calling Address:<br>Global Title: 44-181-444444<br>SSN: 6<br>MAP level parameters:<br>IMSI: 234-15-123456<br>MSISDN: 44-181-654321<br><br>Uk-apn.uk.gprs | GT of SmarTone Macau VLR/SGSN (which SPRS had established from the static mapping)<br>VLR/SGSN<br><br>GT of UK HLR<br>HLR<br><br>IMSI of UK subscriber unchanged<br>MSISDN of UK subscriber unchanged<br>unchanged |
| SmarTone Macau GMSC to SmarTone Macau VLR/SGSN | Same as above | Routing based on SmarTone Macau VLR/SGSN GT |

TABLE 4-continued

| Message sender/ receiver | Message content | Remarks |
|---|---|---|
| SPRS to SmarTone HK GMSC | SCCP Called Address: Global Title: 44-181-444444 SSN: 6 SCCP Calling Address: Global Title: 852-620-005469 SSN: 7/95 MAP level parameters: None. | GT of UK HLR HLR SmarTone HK GT of SPRS corresponding to SmarTone Macau VLR/SGSN VLR/SGSN |

TABLE 4-continued

| Message sender/ receiver | Message content | Remarks |
|---|---|---|
| SmarTone HK GMSC to UK GMSC/HLR | Same as above | Normal routing based on UK HLR GT |

Table 5 describes a MAP_UPDATE_LOCATION or MAP_UPDATE_GPRS_LOCATION response of one embodiment. This message is sent by the UK HLR in response to the update_location or update_GPRS_location request sent by the SmarTone Macau VLR/SGSN. It is sent after the Insert_Subscriber_Data sequence is completed. The SPRS modifies this message so that it is sent to the SmarTone Macau VLR/SGSN.

TABLE 5

| Message sender/ receiver | Message content | Remarks |
|---|---|---|
| UK HLR/GMSC to SmarTone HK GMSC | SCCP Called Address: Global Title: 852-620-005469 SSN: 7/95 SCCP Calling Address: Global Title: 44-181-444444 SSN: 6 MAP level parameters: None. | SmarTone HK GT of SPRS corresponding to SmarTone Macau VLR/SGSN VLR/SGSN GT of UK HLR HLR |
| SmarTone HK GMSC to SPRS | Same as above | Normal Routing based on SmarTone HK SPRS GT |
| SPRS to SmarTone Macau GMSC | SCCP Called Address: Global Title: 853-624-333333 SSN: 7/95 SCCP Calling Address: Global Title: 44-181-444444 SSN: 6 MAP level parameters: None. | GT of SmarTone Macau VLR/SGSN (saved earlier) VLR/SGSN GT of UK HLR HLR |
| SmarTone Macau GMSC to VLR | Same as above | Normal routing based on GT of SmarTone Macau VLR/SGSN |

Inbound Roamer Deregistration (Cancel Location)

The following section details messages and responses for the following example scenario: a UK subscriber who had been roaming in SmarTone Macau has now registered in another network. The registration in the SmarTone Macau network must be cancelled Table 6 describes a MAP_CANCEL_LOCATION request of one embodiment. The UK HLR sends a MAP_CANCEL_LOCATION request to the SmarTone HK GT of SPRS, which identifies SmarTone Macau VLR as the real recipient, and forwards the message accordingly.

TABLE 6

| Message sender/ receiver | Message content | Remarks |
|---|---|---|
| UK GMSC to SmarTone HK GMSC | SCCP Called Address: Global Title: 852-620-005469 SSN: 7/95 SCCP Calling Address: Global Title: 44-181-555555 | SmarTone HK GT of SPRS corresponding to SmarTone Macau VLR/SGSN VLR/SGSN GT of UK HLR |

TABLE 6-continued

| Message sender/receiver | Message content | Remarks |
|---|---|---|
| SmarTone HK GMSC to SPRS | SSN: 6<br>MAP level parameters:<br>IMSI: 234-15-123456<br>Same as above | HLR<br><br>IMSI of Orange UK subscriber<br>Normal routing based on SmarTone HK GT of SPRS |
| SPRS to SmarTone Macau GMSC | SCCP Called Address:<br>Global Title: 853-624-333333<br>SSN: 7/95<br><br>SCCP Calling Address:<br>Global Title: 44-181-555555<br>SSN: 6<br>MAP level parameters:<br>IMSI: 234-15-123456 | GT of SmarTone Macau<br>VLR/SGSN<br>VLR/SGSN<br><br>GT of UK HLR<br>HLR<br><br>IMSI of UK subscriber |
| SmarTone Macau GMSC to VLR | Same as above | Normal Routing based on GT of VLR |

Table 7 describes a MAP_CANCEL_LOCATION response of one embodiment. This message is sent by the SmarTone Macau VLR/SGSN to the UK HLR in response to the Location_Cancel message. The SPRS modifies it so that it appears to be sent by a SmarTone HK VLR.

TABLE 7

| Message sender/receiver | Message content | Remarks |
|---|---|---|
| SmarTone Macau GMSC to SPRS | SCCP Called Address:<br>Global Title: 44-181-555555<br>SSN: 6<br>SCCP Calling Address:<br>Global Title: 853-624-333333<br><br>SSN: 7<br>MAP level parameters: None. | GT of UK HLR<br>HLR<br><br>GT of SmarTone Macau VLR<br>VLR |
| SPRS to SmarTone HK GMSC | SCCP Called Address:<br>Global Title: 44-181-555555<br>SSN: 6<br>SCCP Calling Address:<br>Global Title: 852-620-005469<br><br><br><br>SSN: 7<br>MAP level parameters: None. | GT of UK HLR<br>HLR<br><br>SmarTone HK GT of SPRS corresponding to the SmarTone Macau VLR<br>VLR |
| SmarTone HK GMSC to UK GMSC/HLR | Same as above | Normal Routing based on TT = 0 |

CAMEL messages such as IDP and Continue/Connect for inbound roamers are similarly relayed through the SPRS node. When inbound roamers from the UK register with Smartone Macau, any CAMEL Subscription Information (CSI, either O-CSI, VT-CSI, GPRS-CSI etc) will not be modified when the MAP-Insert Subscriber Data message is relayed from the UK HLR thru the SPRS to Smartone Macau VLR. This is because gsmSCF and gsmSSF address are relayed thru the SPRS anyway.

Figure 9:
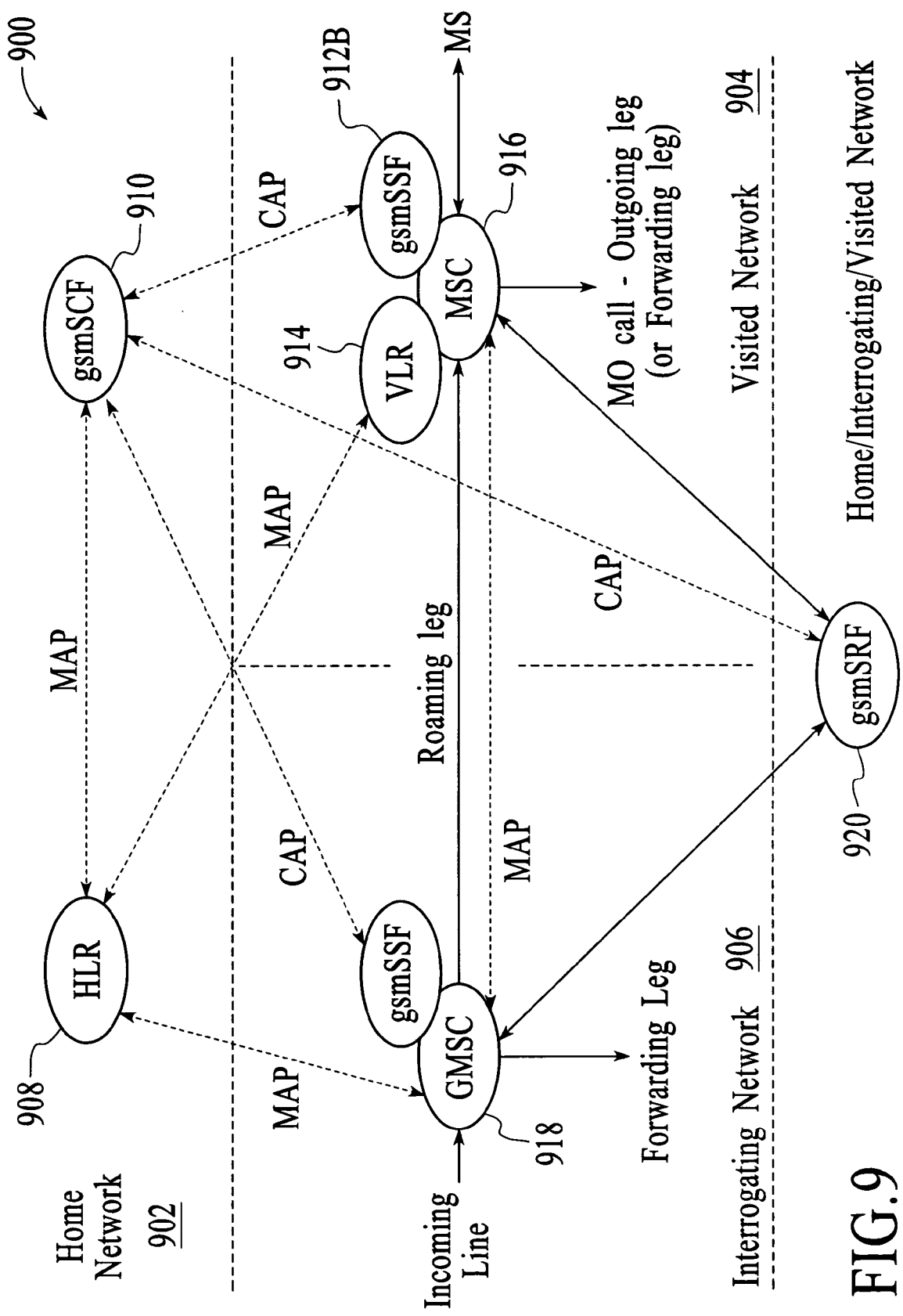
FIG. 9 is an illustration of an architecture 900 that supports CAMEL.

FIG. 9 is an illustration of an architecture 900 that supports CAMEL. The architecture includes a home network 902, a visited network 904, and an interrogating network 906. The home network 902 includes an HLR 908 and a gsmSCF 910. The visited network includes a VLR 914, a gsmSSF 912B, and an MSC 916. The interrogating network includes a GMSC 918 and a gsmSSF 912A. The referenced elements communicate as indicated (with reference to the list of acronyms).

For CAP messages such as IDP that are relayed thru the SPRS node, the VMSC/VLR address, if present, is modified to the corresponding SPRS address.

Outbound Roamer Registration/Location Update

This section describes the messages related to registration/location update of SmarTone Macau subscribers roaming in UK.

Basically, for outbound roamers, all SCCP CdPA, IMSI, GGSN address, GGSN number, SGSN address, gsmSCF number, etc in MAP, Camel/CAP, and GPRS messages are modified into the corresponding SPRS address/number. It is not necessary to modify SCCP CgPA address, SGSN number or visited network numbers since they will have to be relayed thru SPRS node anyway.

Table 8 describes a MAP_UPDATE_LOCATION message of one embodiment. The registration sequence begins with the MAP_UPDATE_LOCATION message. This message is sent by the serving VLR to the HLR.

TABLE 8

| Message sender/receiver | Message content | Remarks |
|---|---|---|
| UK VLR/GMSC to SmarTone HK GMSC | SCCP Called Address:<br>Global Title: 852-620-09-12345<br>SSN: 6<br>SCCP Calling Address:<br>Global Title: 44-181-000001<br>SSN: 7<br>MAP level parameters: | <br>MGT derived from IMSI<br>HLR<br><br>UK VLR GT<br>VLR |

TABLE 8-continued

| Message sender/receiver | Message content | Remarks |
|---|---|---|
| | IMSI: 454-06-09-12345 | IMSI is a SmarTone HK IMSI (454-06) but allocated to a SmarTone Macau subscriber (because of the 09) |
| | MSC address 44-181-000002 | E.164 number of serving MSC |
| | VLR number 44-181-000001 | E.164 number of serving VLR |
| SmarTone HK GMSC to SPRS | Same as above | SmarTone HK GMSC routes the message to the SPRS (based on the 09 in the called address), without any change |
| SPRS to SmarTone Macau GMSC/HLR | SCCP Calling Address:<br>Global Title: 44-181-000001<br>SSN: 7<br>SCCP Called Address:<br>Global Title: 852-624-12345<br><br>SSN: 6<br>MAP level parameters:<br>IMSI: 455-00-12345<br><br>MSC address 44-181-000002<br>VLR number 44-181-000001 | UK VLR id<br>VLR<br><br>Convert SmarTone HK MGT to SmarTone Macau MGT<br>HLR<br><br>Convert SmarTone HK IMSI to SmarTone Macau IMSI<br>UK MSC address unchanged<br>UK VLR number unchanged |

Table 9 describes a MAP_UPDATE_GPRS_LOCATION message of one embodiment.

The registration sequence begins with the MAP_UPDATE_GPRS_LOCATION message. This message is sent by the serving SGSN to the HLR. A UK SGSN address is changed to an ST HK SGSN address to take care the case of network-initiated PDP context activation when SRI-GPRS is issued to ST Macau HLR by ST Macau GGSN. For network-initiated PDP context, the GGSN will inform SPRS address with IMSI. The SPRS can then use the IMSI information to find the true SGSN address to send notification to.

TABLE 9

| Message sender/receiver | Message content | Remarks |
|---|---|---|
| UK VLR/GMSC to SmarTone HK GMSC | SCCP Called Address:<br>Global Title: 852-620-09-12345<br>SSN: 6<br>SCCP Calling Address:<br>Global Title: 44-181-000001<br>SSN: 95<br>MAP level parameters:<br>IMSI: 454-06-09-12345<br><br>SGSN address TLV-IP-UK<br><br>SGSN number 44-181-000001 | MGT derived from IMSI<br>HLR<br><br>UK SGSN GT<br>SGSN<br><br>IMSI is a SmarTone HK IMSI 454-06) but allocated to a SmarTone Macau subscriber (because of the 09)<br>Type, length, value of IP address of SGSN<br>E.164 number of serving SGSN |
| SmarTone HK GMSC to SPRS | Same as above | SmarTone HK GMSC routes the message to the SPRS (based on the 09 in the called address), without any change |
| SPRS to SmarTone Macau GMSC/HLR | SCCP Calling Address:<br>Global Title: 44-181-000001<br>SSN: 95<br>SCCP Called Address:<br>Global Title: 852-624-12345<br><br>SSN: 6<br>MAP level parameters:<br>IMSI: 455-00-12345<br><br>SGSN address TLV-IP-HK<br><br><br>SGSN number 44-181-000001 | UK SGSN id<br>SGSN<br><br>Convert SmarTone HK MGT to SmarTone Macau MGT<br>HLR<br><br>Convert SmarTone HK IMSI to SmarTone Macau IMSI<br>UK SGSN address changed to the SPRS IP address<br>IMSI and UK SGSN address can be saved<br>UK SGSN number unchanged |

Table 10 describes a MAP_INSERT_SUBSCRIBER_DATA request of one embodiment. Upon receiving an MAP_UPDATE_LOCATION message from the UK VLR or an MAP_UPDATE_GPRS_LOCATION message from the UK SGSN, the SmarTone Macau HLR sends a MAP_INSERT_SUBSCRIBER_DATA message to UK VLR/SGSN. The message goes through the SmarTone HK SPRS. The SPRS modifies this message so that it gets correctly routed to the UK VLR/SGSN. Here, SmarTone Macau configures their STP GTT function to route all destinations of non-roaming partners through the SmarTone HK SPRS. When outroamer MS and UK SGSN establishes the first leg of PDP context, the DNS of STHK-APN maps to the SPRS node, which can then establish the second leg of PDP context with the STMC GGSN with the corresponding STMC-APN. Again, the SPRS can use a tunnel ID to relate the two legs. The charging ID can also be relayed. The APN from the HLR does not have the operator name. As long as the sponsoring operator does not use the same APN names as the sponsored operator, there is no need to change the STMC APN into STHK APN.

TABLE 10

| Message sender/receiver | Message content | Remarks |
|---|---|---|
| SmarTone Macau HLR/GMSC to SPRS | SCCP Called Address:<br>Global Title: 44-181-000001<br>SSN: 7/95<br>Translation Type: 0<br>SCCP Calling Address:<br>Global Title: 852-624-555555<br><br>SSN: 6<br>MAP level parameters:<br>IMSI: 455-00-12345<br><br><br><br><br><br>MSISDN: 852-624-111111 | UK VLR/SGSN id<br>VLR/SGSN<br><br><br>Global Title (E.164) of SmarTone Macau HLR<br>HLR<br><br>IMSI will not be included in an insert_sub_data message that is part of a location update. It will only be included if the msg is initiated by HLR (as a result of a subscription change). |
| SPRS to SmarTone HK GMSC | SCCP Called Address:<br>Global Title: 44-181-0000001<br>SSN: 7/95<br>SCCP Calling Address:<br>Global Title: 852-620-005469<br><br><br><br>SSN: 6<br>MAP level parameters:<br>IMSI: 454-06-09-12345<br>MSISDN: 852-624-111111<br>All CSI: gsmSCF => SPRS<br><br><br>APN: APN-STMC => APN-STHK | UK VLR/SGSN id<br>VLR/SGSN<br><br>Change SmarTone Macau HLR GT to SmarTone HK SPRS GT that corresponds to SmarTone Macua HLR<br><br><br>Modify IMSI if present<br>Keep MSISDN unchanged<br>Change all gsmSCF address in any Camel subscription information to the SPRS node<br>Change each STMC APN into the corresponding STHK APN. The correspondence mapping is established statically beforehand |
| SmarTone HK GMSC to UK GMSC/VLR | Same as above | Routing based on the normal routing table (Translation Type 0) |

Table 11 describes a MAP_INSERT_SUBSCRIBER_DATA response of one embodiment. This message is sent by the UK VLR to the SmarTone HK SPRS (which it thinks is the SmarTone HK HLR) to acknowledge the Insert_Subscriber_Data request. The SPRS must identify the SmarTone Macau HLR as the final recipient and must route the message accordingly.

TABLE 11

| Message sender/receiver | Message content | Remarks |
|---|---|---|
| UK VLR/GMSC to SmarTone HK GMSC | SCCP Called Address:<br>Global Title: 852-620-005469<br><br><br>SSN: 6<br>SCCP Calling Address: | This time, the MGT is not derived from IMSI but from the SCCP Calling Address in the insert_sub_data msg<br>HLR |

TABLE 11-continued

| Message sender/receiver | Message content | Remarks |
|---|---|---|
| | Global Title: 44-100000001 | UK VLR/SGSN id |
| | SSN: 7/95 | VLR/SGSN |
| | MAP level parameters: None. | |
| SmarTone HK GMSC to SPRS | Same as above | NORMAL ROUTING BASED ON SPRS GT (AT THIS POINT THE GMSC DOES NOT KNOW THIS MESSAGE IS FOR SMARTONE MACAU). |
| SPRS to SmarTone Macau GMSC/HLR | SCCP Called Address: Global Title: 852-624-555555 SSN: 6 SCCP Calling Address: Global Title: 44-100000001 SSN: 7/95 MAP level parameters: None. | SmarTone Macau HLR GT HLR<br>UK SGSN id<br>VLR/SGSN |

Table 12 describes a MAP_UPDATE_LOCATION or MAP_UPDATE_GPRS_LOCATION response of one embodiment. This message is an acknowledgement to the Update_Location or Update_GPRS_Location request. It is sent by the SmarTone Macau HLR to the UK VLR. SmarTone HK SPRS must modify it to make it look as if it was being sent by the SmarTone HK HLR. Here SmarTone Macau configures its STP GTT function to route all destination of non-roaming partners through the SmarTone HK SPRS.

from the UK VLR. This section describes the messages used for this, along with the role played by the SPRS.

Table 13 describes a MAP_CANCEL_LOCATION message of one embodiment. The SmarTone Macau HLR sends a MAP_CANCEL_LOCATION message to the UK VLR/SGSNN. The SPRS modifies this message to make it seem like it was being sent by a SmarTone HK HLR.

TABLE 12

| Message sender/receiver | Message content | Remarks |
|---|---|---|
| SmarTone Macau HLR/GMSC to SPRS | SCCP Called Address: Global Title: 44-181-000001 SSN: 7/95 SCCP Calling Address: Global Title: 852-624-555555 SSN: 6 MAP level parameters: None. | GT of UK VLR VLR/SGSN<br>SmarTone Macau HLR GT HLR |
| SPRS to SmarTone HK GMSC | SCCP Called Address: Global Title: 44-181-000001 SSN: 7/95 SCCP Calling Address: Global Title: 852-620-005468 SSN: 6 MAP level parameters: None. | UK VLR/SGSN id VLR/SGSN<br>SmarTone HK GT of SPRS corresponding to SmarTone Macau HLR<br>HLR |
| SmarTone HK GMSC to UK GMSC/VLR | Same as above | Normal Routing (Translation Type 0) |

Outbound Roamer Deregistration (Cancel Location)

When a SmarTone Macau subscriber who had been roaming in the UK has registered from another network (home network or any other network), they need to be deregistered

TABLE 13

| Message sender/receiver | Message content | Remarks |
|---|---|---|
| SmarTone Macau HLR/GMSC to SPRS | SCCP Called Address: Global Title: 44-181-000001 SSN: 7/95 SCCP Calling Address: | GT of UK VLR/SGSN VLR/SGSN |

TABLE 13-continued

| Message sender/receiver | Message content | Remarks |
|---|---|---|
| | Global Title: 852-624-555555 | GT of SmarTone Macau HLR |
| | SSN: 6 | HLR |
| | MAP level parameters: | |
| | IMSI: 455-00-123456 | IMSI of SmarTone Macau subscriber |
| SPRS to SmarTone HK GMSC | SCCP Called Address: | |
| | Global Title: 44-181-000001 | GT of UK VLR/SGSNs |
| | SSN: 7/95 | VLR/SGSN |
| | SCCP Calling Address: | |
| | Global Title: 852-620-005468 | SmarTone HK GT of SPRS corresponding to SmarTone Macau |
| | SSN: 6 | HLR |
| | MAP level parameters: | HLR |
| | IMSI: 454-06-09-12345 | CONVERT SMARTONE MACAU IMSI TO SMARTONE HK IMSI |
| SmarTone HK GMSC to UK GMSC/VLR | Same as above | Normal Routing based on Translation Type 0 |

Table 14 describes a MAP_CANCEL_LOCATION response of one embodiment. This message is sent by the UK VLR/SGSN to the SmarTone HK SPRS in response to the Location_Cancel message. The SPRS identifies it as intended for SmarTone Macau HLR and forwards it accordingly. CAMEL messages such as IDP and Continue/Connect for outbound roamers are similarly relayed thru the SPRS node. However the IMSI is modified in the CAP messages when they are relayed thru the SPRS node from UK to HK and then to Macau.

Figure 10:
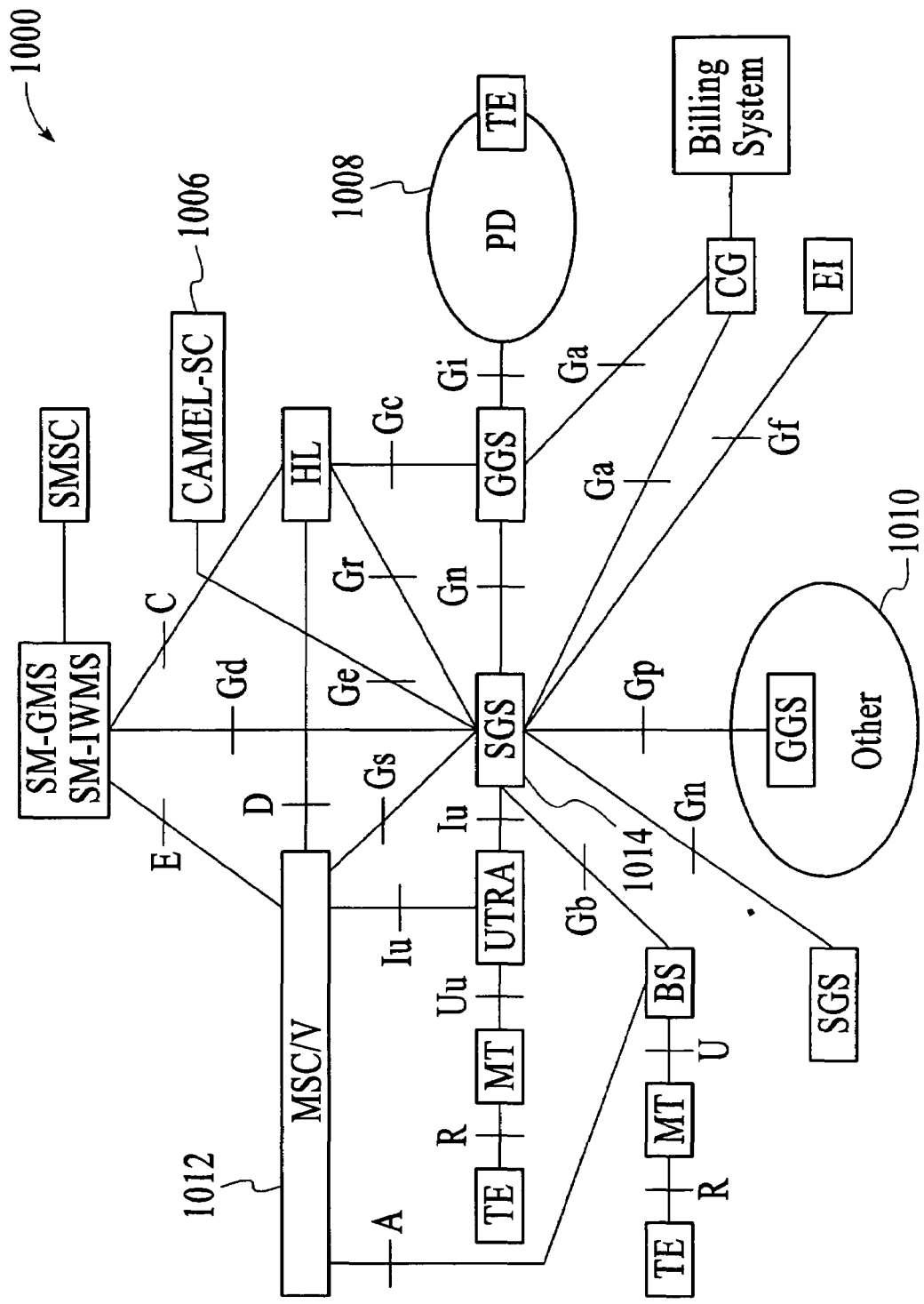
FIG. 10 is a block diagram of an embodiment that supports CAMEL.

FIG. 10 is a diagram of a GPRS reference architecture 1000, which shows the interface point between various network elements. With reference also to the list of acronyms, the architecture includes a central serving GPRS service node

TABLE 14

| Message sender/receiver | Message content | Remarks |
|---|---|---|
| UK VLR/GMSC to SmarTone HK GMSC | SCCP Called Address: | |
| | Global Title: 852-620-005468 | SmarTone HK GT of SPRS corresponding to SmarTone Macau HLR |
| | SSN: 6 | HLR |
| | SCCP Calling Address: | |
| | Global Title: 44-181-000001 | GT of UK VLR/SGSN |
| | SSN: 7/95 | VLR/SGSN |
| | MAP level parameters: None. | |
| SmarTone HK GMSC to SPRS | Same as above | Normal routing based on GT of SmarTone HK GT of SPRS |
| SPRS to SmarTone Macau GMSC/HLR | SCCP Called Address: | |
| | Global Title: 852-624-555555 | GT of SmarTone Macau HLR |
| | SSN: 6 | HLR |
| | SCCP Calling Address: | |
| | Global Title: 44-181-000001 | GT of UK VLR/SGSN |
| | SSN: 7/95 | VLR/SGSN |
| | MAP level parameters: None. | |

Referring again to FIG. 9, for Smartone Macau outbound roamers registering in the UK with Smartone HK IMSI, when the MAP-InsertSubscriberData is relayed thru the SPRS, the SPRS modifies all gsmSCF in any CSI to be a SPRS GT that corresponds to the gsmSCF address. This is different from the inbound roaming case in which no CSI information is modified by SPRS on UK inbound roamers registering in Smartone Macau.

The modification for the outbound roaming case is necessary since the UK has no roaming relationship with Smartone Macau.

Unlike the inbound roaming case, it is not necessary to modify VMSC/VLR numbers in the CAP messages, such as IDP, from the visiting network (e.g. UK) to the home network.

(SGS) 1014. The architecture further includes several switching center, such as a mobile switching center 1012, and a CAMEL switching center 1006. Two networks, a packet data network 1008, and another network 1010 are shown. The other network 1010 is, for example, a PLMN. More than two networks are possible in the architecture.

UK GPRS Roaming in Smartone Macau

Figure 11:
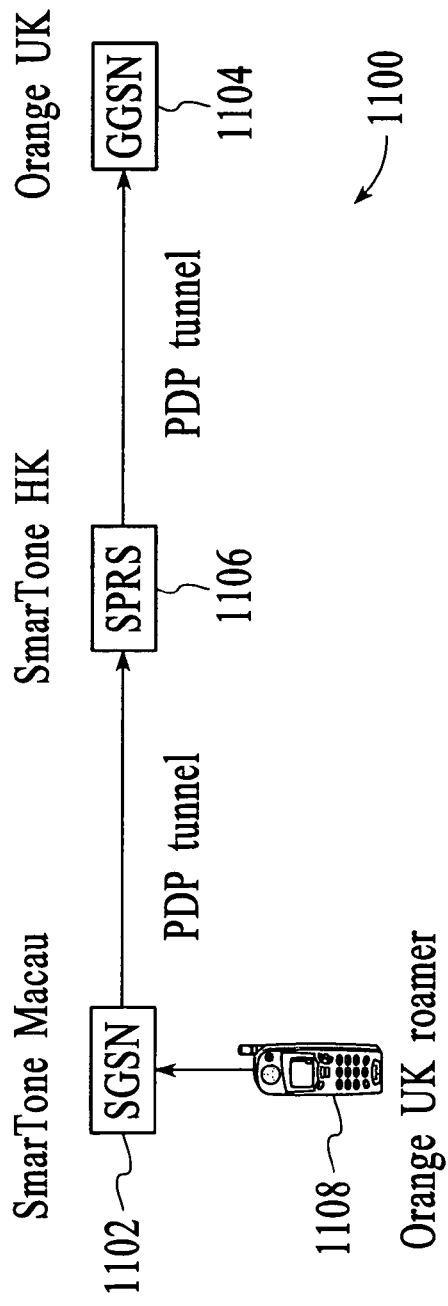
FIG. 11 is a block diagram of an embodiment in which a UK subscriber is roaming in SmarTone Macau using the SGSN of SmarTone Macau.

Referring to FIG. 11, an embodiment 1100 is shown in which a UK subscriber 1108 is roaming in SmarTone Macau, using SGSN 1102 of SmarTone Macau. The embodiment 1100 further includes a GGSN 1104 of the Orange UK network, and a SmarTone HK SPRS 1106. The subscriber performs a PDP context activation with an APN. The ST Macau SGSN 1102 issues a DNS request on the APN; the DNS server is configured to return a SPRS 1106 IP address as the GGSN 1104 for any APN that has no entry. The SPRS 1106 has partial SGSN/GGSN functionality. When ST Macau SGSN 1102 tries to create a PDP context with SPRS 1106 (the first leg of tunnel), SPRS 1106 uses the APN to issue another DNS request in the domain of ST HK, which would return the UK GGSN 1104. The SPRS 1106 then establishes a second leg of PDP context with the UK GGSN 1104. The tunnel ID and IMSI, or charging ID, can be relayed over the second leg, and are used to identify the relaying forward and backward between the two legs of GTP tunnels. In this case, the SPRS 1106 then functions as a STHK GGSN to STMC SGSN and a STHK SGSN to UK GGSN 1104.

The IMSI of the PDP context activation remains the same across the two bridged tunnels. Similar mechanism are applied for modifying/updating PDP context, and deleting PDP context.

GPRS Tunneling Protocol is employed on the Gn interface in order to tunnel user data between different GSNs (GPRS Support Nodes). The protocol supports both signaling and user data under one generic header. It can be used with UDP (User Datagram Protocol) or TCP (Transmission Control Protocol) on the registered port 3386. The GTP version is used only on UDP. The control plane protocol GTP-C (Control) uses registered port 2123 and the user plane protocol GTP-U (User) uses registered port 2152.

When an UK inbound roamer is setting up a PDP context via a GTP-C message or sending a PDP message using GTP-U using UK IMSI, based on the version of GPRS protocol, the UDP message will reach SPRS at the corresponding port. The SPRS examines the message and modify the source IP address to be itself, destination IP address to be the real UK GGSN address. Other parameters can stay the same. The reverse path does the reverse.

INCOMING CALL TO A UK SUBSCRIBER ROAMING IN SmarTone Macau The call (ISUP IAM) first gets routed to the UK GMSC, which makes an SRI query to the UK HLR. The UK HLR can respond to the SRI only after it has queried the SmarTone Macau VLR (which it thinks is the SmarTone HK VLR) with a PRN and has obtained an MSRN.

Table 15 describes a MAP_PROVIDE_ROAMING_NUMBER request of one embodiment. This message is sent by the UK HLR to the SmarTone HK GT of SPRS. The SPRS must forward it to the SmarTone Macau VLR.

TABLE 15

| Message sender/receiver | Message content | Remarks |
|---|---|---|
| UK GMSC to SmarTone HK GMSC | SCCP Called Address:<br>Global Title: 852-620-005469 | SmarTone HK GT of SPRS corresponding to SmarTone Macau VLR |
| | SSN: 7 | VLR |
| | SCCP Calling Address: | |
| | Global Title: 44-181-555555 | GT of UK HLR |
| | SSN: 6 | HLR |
| | MAP level parameters: | |
| | IMSI: 234-15-123456 | IMSI of UK subscriber |
| | MSISDN: 44-181-654321 | MSISDN of UK subscriber |
| SmarTone HK GMSC to SPRS | Same as above | Normal routing based on SmarTone HK GT of SPRS |
| SPRS to SmarTone Macau GMSC | SCCP Called Address:<br>Global Title: 853-624-333333 | GT of SmarTone Macau VLR (SPRS must have it in a table) that corresponds to the SmarTone HK GT of SPRS |
| | SSN: 7 | VLR |
| | SCCP Calling Address: | |
| | Global Title: 44-181-555555 | GT of UK HLR |
| | SSN: 6 | HLR |
| | MAP level parameters: | |
| | IMSI: 234-15-123456 | IMSI of UK subscriber |
| | MSISDN: 44-181-654321 | MSISDN of UK subscriber |
| SmarTone Macau GMSC to VLR | Same as above | Normal routing based on GT of SmarTone Macau VLR |

Table 16 describes a MAP_PROVIDE_ROAMING_NUMBER response of one embodiment. This message is sent by the SmarTone Macau VLR to the UK HLR in response to the PRN request. The SPRS acts as a proxy VLR with a SmarTone HK GT.

TABLE 16

| Message sender/receiver | Message content | Remarks |
|---|---|---|
| SmarTone Macau VLR/GMSC to SPRS | SCCP Called Address:<br>Global Title: 44-181-555555 | GT of UK HLR (copied from SCCP called number in PRN request) |
| | SSN: 6 | HLR |
| | SCCP Calling Address: | |

TABLE 16-continued

| Message sender/receiver | Message content | Remarks |
|---|---|---|
| | Global Title: 853-624-333333 | GT of SmarTone Macau VLR |
| | SSN: 7 | VLR |
| | MAP level parameters: No change needed (main parameter is the MSRN) | |
| SPRS to SmarTone HK GMSC | SCCP Called Address: Global Title: 44-181-555555 SSN: 6 SCCP Calling Address: Global Title: 852-620-005469 SSN: 7 | GT of UK HLR HLR SmarTone HK GT of SPRS corresponding to SmarTone Macau VLR VLR |
| SmarTone HK GMSC to UK GMSC/HLR | Same as above | Normal routing based on GT of UK HLR |

The MSRN may be changed by the SPRS. If the MSRN is not changed, then call routing will be directly from UK to Macau. If it is changed, then call routing will be from UK to HK, and then to Macau. The ST HK switch will either use ISUP loopback, or IN to route the call on the specially ranged MSRN of SH HK to the SPRS platform, which then will redirect the call onto the real MSRN. One advantage is that IDD markup on the roaming rerouted call by UK can be always applied on top of route to HK where UK has a roaming partnership. However, the call will be indirectly routed between UK and Macau via HK. If the distance between HK and Macau is large, it might be confusing and expensive. One approach to avoiding this possibility is for HK and Macau to set up special leased lines for such indirect calls. In addition, rerouted calls to HK should be cheaper than rerouted calls to Macau, so outbound roamers of UK don't get overcharged. To recover the indirect routing cost, HK/Macau can have a different roaming rates for a mobile terminated call at Macau.

If MSRN is not changed, the rerouting charge between the sponsoring country and sponsored country should be similar to avoid losing money for UK operator or overcharging the outbound roamer. This turns out to be the case for HK and Macau.

Macau GPRS Roaming in UK

Figure 12:
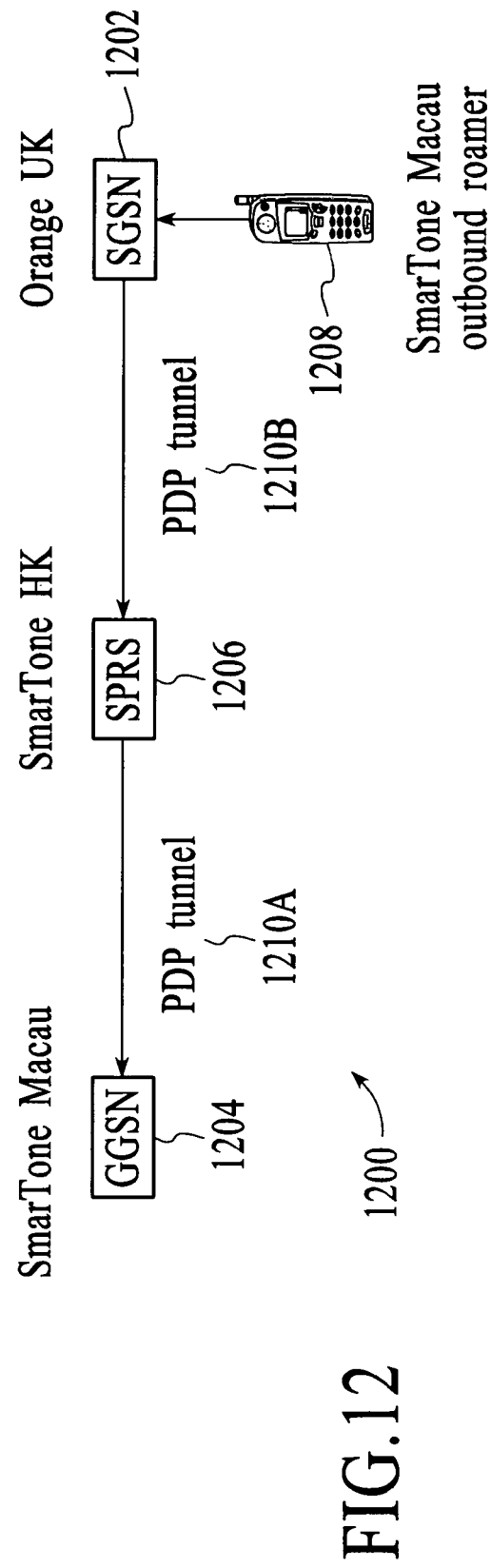
FIG. 12 is a block diagram of an embodiment in which a SmarTone Macau subscriber is roaming in Orange UK, using the SGSN of Orange UK.

Referring to FIG. 12, an embodiment 1200 is shown in which a SmarTone Macau subscriber 1208 is roaming in Orange UK, using SGSN 1202 of Orange UK. The embodiment 1200 further includes a GGSN 1204 of the SmarTone Macau network, and a SmarTone HK SPRS 1206. PDP tunnels 1210A and 1210B are also shown. The handset selects the ST HK IMSI and ST PDP profile. The subscriber 1208 performs a PDP context activation with an APN. The UK SGSN 1202 issues DNS request on the APN, the DNS server must be configured to return SPRS IP address as the GGSN for such an APN. The SPRS 1206 has partial SGSN/GGSN functionality. When UK SGSN 1202 tries to create a PDP context with SPRS (the first leg of the tunnel), the SPRS 1206 first finds the corresponding ST Macau APN and uses the translated APN to issue another DNS request in the domain of ST HK which returns the ST-Macau GGSN. The SPRS 1206 then establishes a second leg of PDP context with the ST-Macau GGSN 1204. The tunnel ID and IMSI or charging ID can be relayed over the second leg, and are used to identify the relaying forward and functions as a STHK GGSN to the UK SGSN 1202, and a STMC GGSN to STHK SGSN.

The tunnel ID for the first tunnel has the ST HK IMSI, while the tunnel ID for the second tunnel has the ST Macau IMSI. Other information, such as NSAPI, Charging ID, PDP address etc can be relayed thru the SPRS node 1296.

GPRS Tunneling Protocol is employed on the Gn interface in order to tunnel user data between different GSNs (GPRS Support Nodes). The protocol supports both signaling and user data under one generic header. It can be used with UDP (User Datagram Protocol) or TCP (Transmission Control Protocol) on the registered port 3386. The GTP version one is used only on UDP. The control plane protocol GTP-C (Control) uses registered port 2123, and the user plane protocol GTP-U (User) uses registered port 2152.

When a Smartone Macau outbound roamer is setting up a PDP context via a GTP-C message or sending a PDP message using GTP-U using Smartone HK IMSI, based on the version of GPRS protocol, the UDP message will reach SPRS at the corresponding port. The SPRS examines the message and modifies the source IP address to be itself, destination IP address to be the real Smartone Macau GGSN address, and (if present) APN to be the one at Smartone Macau that corresponds to the APN from Smart HK IMSI. It also changes TID Smartone HK IMSI to its corresponding Smartone Macau IMSI. The reverse path does the reverse.

The mapping of APN Macau with APN HK and the corresponding GGSN can be maintained locally via a DB, or configuration file, or external DNS or Directory service.

Incoming Call to a Smartone Macau Subscriber Roaming in UK

All calls to a SmarTone Macau subscriber roaming in UK are first routed to the SmarTone Macau GMSC through an ISUP IAM. The GMSC then queries the HLR by means of a MAP_SEND_ROUTING_INFORMATION request. This message is within the SmarTone Macau PLMN. However, in order to respond to the SRI, the SmarTone Macau HLR must query the UK VLR for an MSRN. This is done by sending a MAP_PROVIDE_ROAMING_NUMBER message. This message and its response go across PLMNs and hence are of concern to the SPRS.

Table 17 describes a MAP_PROVIDE_ROAMING_NUMBER request of one embodiment. This message is sent by the SmarTone Macau HLR to the UK VLR. The SPRS makes it look like a PRN request coming from a SmarTone HK HLR

TABLE 17

| Message sender/receiver | Message content | Remarks |
|---|---|---|
| SmarTone Macau GMSC to SPRS | SCCP Called Address:<br>Global Title: 44-181-333333<br>SSN: 7<br>SCCP Calling Address:<br>Global Title: 853-624-555555<br>SSN: 6<br>MAP level parameters:<br>IMSI: 455-00-12345<br>MSISDN: 852-624-654321 | GT of UK VLR<br>VLR<br><br>GT of SmarTone Macau HLR<br>HLR<br><br>IMSI of SmarTone Macau subscriber<br>MSISDN of SmarTone Macau subscriber unchanged if present |
| SPRS to SmarTone HK GMSC | SCCP Called Address:<br>Global Title: 44-181-333333<br>SSN: 7<br>SCCP Calling Address:<br>Global Title: 852-620-005468<br><br>SSN: 6<br>MAP level parameters:<br>IMSI: 454-06-09-12345<br><br>MSISDN: 852-624-654321 | GT of UK VLR<br>VLR<br><br>Replace SmarTone Macau HLR GT with SPRS GT (corresponding to SmarTone Macau HLR)<br>HLR<br><br>Replace SmarTone Macau IMSI with the corresponding SmarTone HK IMSI<br>Keep the SmarTone Macau MSISDN |
| SmarTone HK GMSC to UK GMSC/VLR | Same as above | Normal routing based on GT of UK VLR |

Table 18 describes a MAP_PROVIDE_ROAMING_NUMBER response of one embodiment. This message is sent by the UK VLR to the SmarTone HK GT of SPRS. The SPRS recognizes it as really intended for the SmarTone Macau HLR and correctly forwards it.

Incoming SMS to a UK Subscriber Roaming in Smartone Macau

The UK SMSC forwards the message to the SmarTone HK GT of the SPRS that correspond to the real SmarTone Macau VMSC. The SPRS relays the message to the real SmarTone Macau VMSC.

TABLE 18

| Message sender/receiver | Message content | Remarks |
|---|---|---|
| UK GMSC to SmarTone HK GMSC | SCCP Called Address:<br>Global Title: 852-620-005468<br><br>SSN: 6<br><br>SCCP Calling Address:<br>Global Title: 44-181-333333<br>SSN: 7<br>MAP level parameters: No change needed (main parameter is the MSRN) | SmarTone HK GT of SPRS corresponding to SmarTone Macau HLR<br>HLR<br>HLR<br><br>GT of UK VLR<br>VLR |
| SmarTone HK GMSC to SPRS | Same as above | Normal routing based on SmarTone HK GT of SPRS |
| SPRS to SmarTone Macau GMSC | SCCP Called Address:<br>Global Title: 853-624-555555<br><br><br>SSN: 6<br>SCCP Calling Address:<br>Global Title: 44-181-333333<br>SSN: 7 | GT of SmarTone Macau HLR that corresponds to the SmarTone HK GT of SPRS<br>HLR<br><br>GT of UK VLR<br>VLR |
| SmarTone Macau GMSC to HLR | Same as above | Normal routing based on GT of SmarTone Macau HLR |

Table 19 describes a MAP_Forward_SMS request of one embodiment. This message is sent by the UK SMSC to the SmarTone HK GT of SPRS that corresponds to a SmarTone Macau VMSC/SGSN. The SPRS relays it to the real VMSC/SGSN.

MO or Reply SMS for a UK Subscriber Roaming in SmarTone Macau

When a UK subscriber roams in SmarTone Macau to send a SMS/reply, the message will go through the SPRS to the UK SMSC. The SPRS will make the message look as if it is coming from a SmarTone HK GT.

TABLE 19

| Message sender/receiver | Message content | Remarks |
| --- | --- | --- |
| UK SMSC/GMSC to SmarTone HK GMSC/SPRS | SCCP Called Address: | |
| | Global Title: 852-620-005467 | SmarTone HK GT of SPRS corresponding to the real SmarTone Macau VMSC/SGSN |
| | SSN: 8/95 | VMSC/SGSN |
| | SCCP Calling Address: | |
| | Global Title: 44-181-00000003 | GT of UK SMSC |
| | SSN: 8 | SMSC |
| SPRS to SmarTone Macau GMSC | SCCP Called Address: | |
| | Global Title: 853-624-555557 | GT of SmarTone Macau VMSC/SGSN |
| | SSN: 8/95 | VMSC/SGSN |
| | SCCP Calling Address: | |
| | Global Title: 44-181-00000003 | UK SMSC |
| | SSN: 8 | SMSC |
| SmarTone HK GMSC to VMSC | Same as above | Normal routing based on GT of SmarTone Macau VMSC |

Table 20 describes a MAP_Forward_SMS response of one embodiment. This message is sent by the SmarTone Macau-VMSC/SGSN to the UK SMSC. The message is routed through SPRS to make it looks as if it is coming from SmarTone HK.

Table 21 describes a MAP_Forward_SMS request of one embodiment. This message is sent by the SmarTone Macau-VMSC/SGSN to the UK SMSC. The message is routed through SPRS to make it looks as if it is coming from SmarTone HK.

TABLE 20

| Message sender/receiver | Message content | Remarks |
| --- | --- | --- |
| SmarTone Macau VMSC to SmarTone Macau GMSC | SCCP Called Address: | |
| | Global Title: 44-181-00000003 | UK SMSC GT |
| | SSN: 8 | SMSC |
| | SCCP Calling Address: | |
| | Global Title: 853-624-555557 | GT of SmarTone Macau VMSC/SGSN |
| | SSN: 8/95 | VMSC/SGSN |
| SmarTone HK GMSC to SPRS | Same as above | Normal routing based on GT of SPRS |
| SPRS to SmarTone HK GMSC | SCCP Called Address: | |
| | Global Title: 44-181-00000003 | GT of UK SMSC |
| | SSN: 8 | SMSC |
| | SCCP Calling Address: | |
| | Global Title: 852-620-005467 | SmarTone HK GT corresponds to the real SmarTone Macau VMSC/SGSN |
| | SSN: 8/95 | VMSC/SGSN |
| SmarTone HK GMSC to UK GSMC/SMSC | Same as above | Normal routing based on GT of UK SMSC |

TABLE 21

| Message sender/receiver | Message content | Remarks |
|---|---|---|
| SmarTone Macau VMSC to SmarTone Macau GMSC | SCCP Called Address: Global Title: 44-181-00000003 SSN: 8 SCCP Calling Address: Global Title: 853-624-555557 SSN: 8/95 | UK SMSC GT SMSC GT of SmarTone Macau VMSC/SGSN VMSC/SGSN |
| SmarTone Macau GMSC to SPRS | Same as above | Normal routing based on GT of SPRS |
| SPRS to SmarTone HK GMSC | SCCP Called Address: Global Title: 44-181-00000003 SSN: 8 SCCP Calling Address: Global Title: 852-620-005467 SSN: 8/95 | GT of UK SMSC SMSC SmarTone HK GT corresponds to the real SmarTone Macau VMSC/SGSN VMSC/SGSN |
| SmarTone HK GMSC to UK GSMC/SMSC | Same as above | Normal routing based on GT of UK SMSC |

Table 22 describes a MAP_Forward_SMS response of one embodiment. This message is sent by the UK SMSC to the SmarTone HK GT of the SPRS corresponding to the SmarTone Macau VMSC/SGSN. The SPRS relays the response to the real VMSC/SGSN at SmarTone Macau.

TABLE 22

| Message sender/receiver | Message content | Remarks |
|---|---|---|
| UK SMSC/GMSC to SmarTone HK GMSC/SPRS | SCCP Called Address: Global Title: 852-620-005467 SSN: 8 SCCP Calling Address: Global Title: 44-181-00000003 SSN: 8 | SmarTone HK GT of SPRS corresponding to the real SmarTone Macau VMSC/sGSN VMSC/SGSN GT of UK SMSC SMSC |
| SPRS to SmarTone Macau GMSC | SCCP Called Address: Global Title: 853-624-555557 SSN: 8 SCCP Calling Address: Global Title: 44-181-00000003 SSN: 8 | GT of SmarTone Macau VMSC VMSC UK SMSC SMSC |
| SmarTone Macau GMSC to VMSC/SGSN | Same as above | Normal routing based on GT of SmarTone Macau VMSC/SGSN |

Incoming SMS to a Smartone Macau Subscriber Roaming in the UK

When a SmarTone Macau SMSC sends a SMS to a SmarTone Macau subscriber roaming in the UK, it first queries SmarTone Macau HLR through MAP SRI-SM. The HLR returns the UK VMSC/SGSN. However, in order to route the message to UK VMSC/SGSN, the message passes through the SPRS.

Table 23 describes a MAP_Forward_SMS request of one embodiment. This message is sent by the SmarTone Macau the SMSC, to the UK VMSC/SGSN. The SPRS makes it look like a request coming from the SmarTone HK GT.

TABLE 23

| Message sender/receiver | Message content | Remarks |
|---|---|---|
| SmarTone Macau GMSC to SPRS | SCCP Called Address: Global Title: 44-181-00000002 SSN: 8/95 SCCP Calling Address: Global Title: 853-624-555556 SSN: 8 | GT of UK VMSC/sGSN VMSC/SGSN GT of SmarTone Macau SMSC SMSC |

TABLE 23-continued

| Message sender/ receiver | Message content | Remarks |
|---|---|---|
| | MAP level parameters: | |
| | IMSI: 455-00-12345 | IMSI of SmarTone Macau subscriber |
| SPRS to SmarTone HK GMSC | SCCP Called Address: Global Title: 44-181-00000002 SSN: 8/95 SCCP Calling Address: Global Title: 852-620-005469 | GT of UK VMSC/SGSN VMSC/SGSN<br><br>Replace SmarTone Macau SMSC GT with SmarTone HK GT (corresponding to SmarTone Macau SMSC) |
| | SSN: 8 | SMSC |
| | MAP level parameters: | |
| | IMSI: 454-06-09-12345 | Replace SmarTone Macau IMSI with the corresponding SmarTone HK IMSI |
| SmarTone HK GMSC to UK VMSC/SGSN | Same as above | Normal routing based on GT of UK VMSC/SGSN |

Table 24 describes a MAP_Forward_SMS response of one embodiment. This message is sent by the UK VMSC/SGSN to the SPRS. The SPRS recognizes it as really intended for the SmarTone Macau SMSC and correctly forwards it. forwards the message to the real SmarTone Macau SMSC address. The real SMSC can then forward the message on in the normal manner.

TABLE 24

| Message sender/ receiver | Message content | Remarks |
|---|---|---|
| UK GMSC to SmarTone HK GMSC | SCCP Called Address: Global Title: 852-620-005469 | SmarTone HK GT of SPRS corresponding to SmarTone Macau SMSC |
| | SSN: 8 | SMSC |
| | SCCP Calling Address: Global Title: 44-181-00000002 SSN: 8/95 | GT of UK VMSC/SGSN VMSC/SGSN |
| SmarTone HK GMSC to SPRS | Same as above | Normal routing based on GT of SPRS |
| SPRS to SmarTone Macau GMSC | SCCP Called Address: Global Title: 853-624-555556 SSN: 8 | GT of SmarTone Macau SMSC SMSC |
| | SCCP Calling Address: Global Title: 44-181-00000002 SSN: 8 | GT of UK VMSC/SGSN VMSC/SGSN |
| SmarTone Macau GMSC to SmarTone Macau SMSC | Same as above | Normal routing based on GT of SmarTone Macau SMSC |

MO or Reply SMS for a Smartone Macau Subscriber Roaming in the UK

When a SmarTone Macau subscriber roams in the UK to send a SMS/reply, the message arrives at the SPRS. The SPRS Table 25 describes a MAP_Forward_SMS request of one embodiment. This message is sent by the UK VMSC/SGSN to the SmarTone HK GT of the SPRS that corresponds to the SmarTone Macau SMSC. The SPRS sends it to the real SmarTone Macau SMSC.

TABLE 25

| Message sender/receiver | Message content | Remarks |
|---|---|---|
| UK GMSC to SmarTone HK GMSC to SPRS | SCCP Called Address:<br>Global Title: 852-620-005469<br>SSN: 8<br>SCCP Calling Address:<br>Global Title: 44-181-00000002<br>SSN: 8/95<br>MAP level parameters:<br>IMSI: 454-06-09-12345 | SmarTone HK GT corresponding SmarTone Macau SMSC<br>VMSC<br><br>GT of UK VMSC<br>VMSC/SGSN<br><br>SmarTone HK IMSI of SmarTone Macau subscriber |
| SPRS to SmarTone Macau GMSC | SCCP Called Address:<br>Global Title: 853-624-555556<br>SSN: 8<br>SCCP Calling Address:<br>Global Title: 44-181-00000002<br>SSN: 8/95<br>MAP level parameters:<br>IMSI: 455-00-12345 | GT of SmarTone Macau SMSC<br>VMSC<br><br>UK VMSC/SGSN<br>VMSC/SGSN<br><br>Replace SmarTone HK IMSI with the corresponding SmarTone Macau IMSI |
| SmarTone Macau GMSC to SmarTone Macau SMSC | Same as above | Normal routing based on GT of SmarTone Macau SMSC |

Table 26 describes a MAP_Forward_SMS response of one embodiment. This message is sent by the SmarTone Macau SMSC to the UK VMSC/SGSN. The message goes through the SPRS to make it look as if it is coming from SmarTone HK.

TABLE 26

| Message sender/receiver | Message content | Remarks |
|---|---|---|
| SmarTone Macau SMSC to SmarTone Macau GMSC | SCCP Called Address:<br>Global Title: 44-181-00000002<br>SSN: 8/95<br>SCCP Calling Address:<br>Global Title: 853-624-555556<br>SSN: 8 | UK VMSC/SGSN address<br>VMSC/SGSN<br><br>GT of SmarTone Macau SMSC<br>VMSC |
| SmarTone Macau GMSC to SPRS | Same as above | Normal routing based on GT of SPRS |
| SPRS to SmarTone HK GMSC | SCCP Called Address:<br>Global Title: 44-181-00000002<br>SSN: 8/95<br>SCCP Calling Address:<br>Global Title: 852-620-005469<br>SSN: 8 | GT of UK VMSC/SGSN<br>VMSC/SGSN<br><br>SmarTone HK GT corresponding SmarTone Macau SMSC<br>VMSC |
| SmarTone HK GMSC to UK VMSC/SGSN | Same as above | Normal routing based on GT of UK VMSC |

Receiving SMS for Smartone Macau Subscribers from Overseas and Sending SMS by Smartone Macau Subscribers to Overseas These functionalities can be supported on the same SPRS node with minimum changes.

Alternatively, SmarTone Macau can use the SmarTone HK SMSC (as previously described) as the relay mechanism for international SMS.

Sending SMS by Smartone Macau Roaming Partners to Smartone Macau Subscribers to Overseas Non-Partner Networks This functionality can be supported on the same SPRS node with minimum changes. In this case, the subscriber uses a SmarTone HK IMSI to register with a network that has no roaming relationship with ST Macau. The SMS sending operator has a roaming relationship with SmarTone Macau. Based on signal flows as described herein, SRI-SM on ST Macau MSISDN returns ST Macau IMSI and the non-roaming network MSC. The sending operator use these the ST Macau IMSI to send the SMS to the non-roaming network MSC, which contains only ST HK IMSI, resulting in failure. One solution is to change the MSC/VLR address to a SmarTone HK GT during registration from non-roaming network with SmarTone HK IMSI. The SG dynamically maintains the mapping which is replicated across two physical boxes when SG is implemented using two boxes with the same SPC. In this way, an SMS to an outbound roamer in a non-roaming network will come to the SG first before the SG sends it out to the real MSC (this is possible since ST HK has the roaming relationship with the network of the MSC, even though ST Macau does not).

Other Scenarios

This section lists the other messages that are processed by the SPRS.

Scenarios for Outbound Roamers

Table 27 describes scenarios for outbound roamers.

TABLE 27

| Message | Direction | Fields to be changed by SPRS |
|---|---|---|
| MAP_Send_Routing_Info_For_SM request | UK -> SmarTone Macau | SCCP Called Address, MSISDN |
| MAP_Send_Routing_Info_For_SM response | SmarTone Macau -> UK | SCCP Calling Address, Translation Type, IMSI, Network Node Number (MSC id) |
| MAP_Forward_Short_Message request | SmarTone Macau -> UK | SCCP Calling Address, Translation Type |
| MAP_Forward_Short_Message response | UK -> SmarTone Macau | SCCP Called Address |
| MAP_Forward_Short_Message request | UK -> SmarTone Macau | SCCP Called Address, IMSI |
| MAP_Forward_Short_Message response | SmarTone Macau -> UK | SCCP Calling Address, Translation Type |
| MAP_Report_SM_Delivery_Status request | UK -> SmarTone Macau | SCCP Called Address, MSISDN |
| MAP_Report_SM_Delivery_Status response | SmarTone Macau -> UK | SCCP Calling Address, Translation Type |
| MAP_Ready_For SM request | UK -> SmarTone Macau | SCCP Called Address, IMSI |
| MAP_Ready_For_SM response | SmarTone Macau -> UK | SCCP Calling Address, Translation Type |
| MAP_Alert_Service_Centre request | UK -> SmarTone Macau | SCCP Called Address |
| MAP_Alert_Service_Centre response | SmarTone Macau -> UK | SCCP Calling Address, Translation Type |
| MAP_Activate_Trace_Mode request | SmarTone Macau -> UK | SCCP Calling Address, Translation Type, IMSI |
| MAP_Activate_Trace_Mode response | UK -> SmarTone Macau | SCCP Called Address |
| MAP_Deactivate_Trace_Mode request | SmarTone Macau -> UK | SCCP Calling Address, Translation Type, IMSI |
| MAP_Dectivate_Trace_Mode response | UK -> SmarTone Macau | SCCP Called Address |
| MAP_Purge_MS request | SmarTone Macau -> UK | SCCP Calling Address, Translation Type, IMSI |
| MAP_Purge_MS response | UK -> SmarTone Macau | SCCP Called Address |
| MAP_Send_Authentication_Info request | UK -> SmarTone Macau | SCCP Called Address, IMSI |
| MAP_Send_Authentication_Info response | SmarTone Macau -> UK | SCCP Calling Address, Translation Type |
| MAP_Delete_Subscriber_Data request | SmarTone Macau -> UK | SCCP Calling Address, Translation Type, IMSI |
| MAP_Delete_Subscriber_Data response | UK -> SmarTone Macau | SCCP Called Address |
| MAP_Register_SS request | UK -> SmarTone Macau | SCCP Called Address |
| MAP_Register_SS response | SmarTone Macau -> UK | SCCP Calling Address, Translation Type |
| MAP_Activate_SS request | UK -> SmarTone Macau | SCCP Called Address |
| MAP_Activate_SS response | SmarTone Macau -> UK | SCCP Calling Address, Translation Type |
| MAP_Deactivate_SS request | UK -> SmarTone Macau | SCCP Called Address |

TABLE 27-continued

| Message | Direction | Fields to be changed by SPRS |
|---|---|---|
| MAP_Deactivate_SS response | SmarTone Macau -> UK | SCCP Calling Address, Translation Type |
| MAP_Interrogate_SS request | UK -> SmarTone Macau | SCCP Called Address |
| MAP_Interrogate_SS response | SmarTone Macau -> UK | SCCP Calling Address |
| MAP_Purge_MS request | UK -> SmarTone Macau | SCCP Called Address, IMSI |
| MAP_Purge_MS response | SmarTone Macau -> UK | SCCP Calling Address, Translation Type |

Scenarios for Inbound Roamers

All the scenarios listed for outbound roamers are valid for inbound roamers as well, and hence need not be listed again. The role of the SPRS is different in each case. In She UK->SmarTone Macau direction the SCCP Called Address must be modified, while in the SmarTone Macau to UK direction the SCCP Calling Address and the Translation Type must be modified. In either case, any application (MAP) level parameters that need modification are modified (e.g., IMSI, MSC address, VLR address etc.)

Smartone Macau Subscriber Roaming in Smartone HK or Operators who have Roaming Relationships with Smartone Macau This is a rather special case. In this case, the SmarTone Macau subscriber should be prevented from using the SmarTone HK IMSI when roaming in SmarTone HK or any operators who have a roaming relationship with SmarTone Macau. The subscriber uses the SmarTone Macau IMSI. Thus, the SmarTone Macau IMSI is used in SmarTone HK or these operators. In other networks without the roaming relationships, the SmarTone HK IMSI is used.

One reason for this is that if SmarTone HK IMSI is used, (a) billing will be complex, and (b) SMS could be problematic since the sending SMSC of these operators will use SmarTone Macau IMSI to forward SMS to the subscribers, which would conflict with the SmarTone HK IMSI in the VMSC/VLR of these operators (unless all map messages between STMC and these operators go through the SPRS node, but that will be less scalable).

It is possible that SmarTone Macau has a voice roaming relationship with operator X but not a GPRS roaming relationship (the reverse typically does not occur). In this case, update location rejection will depend on whether it is a VLR update location or a SGSN update location request. In both cases, the SmarTone HK will direct any update location with the specific IMSI range to the SPRS node. If it is GPRS request, then if there is no GPRS roaming relationship, then proceed normal, reject otherwise. If it is a VLR request, then if there is no voice roaming relationship, then proceed normal, reject otherwise.

SmarTone HK is used as an example. Other operators that have roaming relationships with SmarTone Macau follow similar procedures.

Table 28 describes scenarios for a SmarTone Macau Subscriber Roaming in SmarTone HK with a SmarTone HK IMSI. The update_location, or update_GPRS_location request is routed to the SPRS by the SmarTone HK GMSC. It is rejected by the SPRS. The SPRS does not forward this message; instead, it sends an update_location response with a user error "Unknown Subscriber" or "Roaming Not Allowed".

TABLE 28

| Message sender/receiver | Message content | Remarks |
|---|---|---|
| SmarTone HK GMSC to SPRS Update_location or Update-gprs_location request | SCCP Called Address: Global Title: 852-620-09-12345 SSN: 6 SCCP Calling Address: Global Title: 852-620-333333 SSN: 7/95 MAP level parameters: IMSI: 454-06-09-12345 MSC Address: 852-620-111111 Or SGSN address: TL-IP-STHK VLR/SGSN Number: 852-620-333333 | MGT derived from IMSI HLR GT of SmarTone HK VLR/SGSN VLR/SGSN SmarTone HK IMSI of SmarTone Macau Subscriber GT of SmarTone HK MSC Or IP address of HK SGSN GT of SmarTone HK VLR/SGSN |
| SPRS to SmarTone HK GMSC/VLR Update_location Or | SCCP Called Address: Global Title: 852-620-333333 SSN: 7/95 SCCP Calling Address: Global Title: 852-620- | GT of SmarTone HK VLR/SGSN VLR/SGSN SmarTone HK GT of SPRS |

TABLE 28-continued

| Message sender/receiver | Message content | Remarks |
|---|---|---|
| Update_GPRS_location response | 0005468<br>SSN: 6<br>MAP Level Parameters:<br>User Error | HLR<br><br>Unknown Subscriber or Roaming Not Allowed |

The case of a SmarTone Macau Subscriber Roaming in SmarTone HK with SmarTone Macau IMSI is treated as normal roaming and is not routed to the SPRS. The update_location request goes directly to SmarTone Macau, and the subsequent Insert_Subscriber_Data goes directly to the SmarTone HK VLR without being routed to the SmarTone HK SPRS.

Smartone Macau Subscriber Using Smartone HK IMSI Locally

This is a rather special case. In this case, the SmarTone Macau subscriber is prevented from using the SmarTone HK IMSI when in SmarTone Macau. The subscriber uses the SmarTone Macau IMSI. Thus, the SmarTone Macau IMSI is used in SmarTone HK and Macau; in networks without roaming relationships, the SmarTone HK IMSI is used.

Table 29 describes scenarios for a SmarTone Macau Subscriber in SmarTone Macau with a SmarTone HK IMSI. The update location, or update_gprs_location request is routed to the SPRS by the SmarTone Macau GMSC. It is rejected by the SPRS. The SPRS does not forward this message; instead, it sends an update_location response with a user error "Unknown Subscriber" or "Roaming Not Allowed".

Insert_Subscriber_Data goes directly to the SmarTone Macau VLR without being routed to the SPRS.

Performance and Availability

The following is an example of conditions in one anticipated environment. Other environments are also anticipated, but not used as specific examples. This section includes performance and availability considerations for the SPRS given the example environment.

The SPRS described herein operates successfully in given approximately 12000 inbound/outbound roamers in a given day. Assumed message volumes include 20 MAP messages per roamer per day, or about 240000 messages per day. Assumes distribution over an 8-hour period includes: 30000 messages per hour, or 8-10 messages per second. Peak load is considered to be twice this rate, or about 20 messages per second.

The SPRS provides access to services previously unavailable to inbound roamers and outbound roamers. A high-availability platform is recommended. For example, a platform based on a duplicated architecture. In one embodiment, the SPRS is configured in a pair of systems. It is assigned a

TABLE 29

| Message sender/receiver | Message content | Remarks |
|---|---|---|
| SmarTone Macau GMSC to SPRS Update_location or Update_gprs location request | SCCP Called Address:<br>Global Title: 852-620-09-12345<br>SSN: 6<br>SCCP Calling Address:<br>Global Title: 853-624-333333<br><br>SSN: 7/95<br>MAP level parameters:<br>IMSI: 454-06-09-12345<br><br>MSC Address: 853-624-111111<br>Or SGSN address: TL-IP-STMC<br>VLR/SGSN Number: 853-624-333333 | MGT derived from IMSI<br>HLR<br><br>GT of SmarTone Macau VLR/SGSN<br>VLR/SGSN<br><br>SmarTone HK IMSI of SmarTone Macau Subscriber<br>GT of SmarTone Macau MSC<br><br>Or IP address of STMC SGSN<br>GT of SmarTone Macau VLR/SGSN |
| SPRS to SmarTone Macau GMSC/VLR Update_location response | SCCP Called Address:<br>Global Title: 853-624-333333<br><br>SSN: 7/95<br>SCCP Calling Address:<br>Global Title: 852-620-0005468<br>SSN: 6<br>MAP Level Parameters:<br>User Error | GT of SmarTone Macau VLR/SGSN<br>VLR/SGSN<br><br>SmarTone HK GT of SPRS<br>HLR<br><br>Unknown Subscriber or Roaming Not Allowed |

Figure 13:
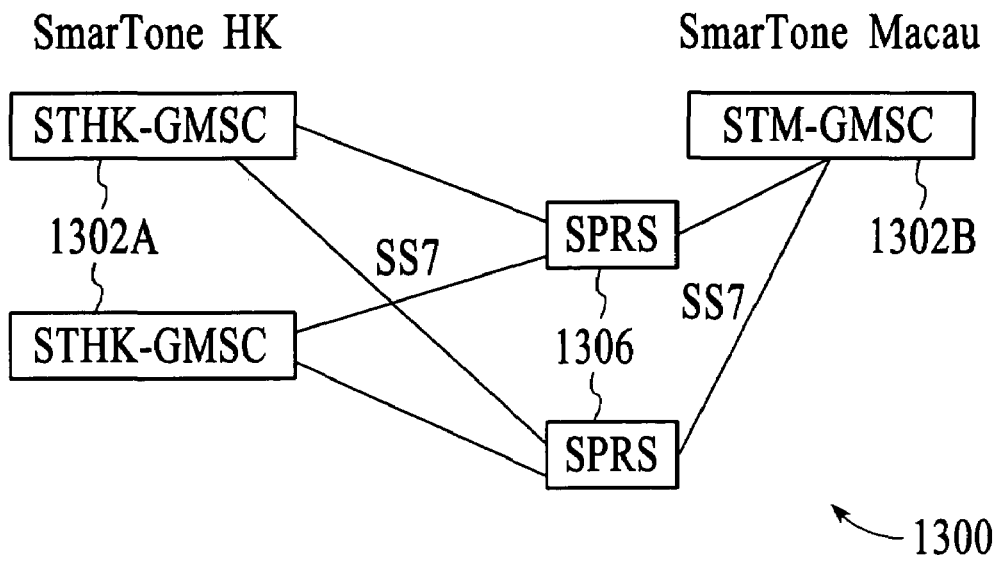
FIG. 13 is a block diagram of an embodiment in which multiple SPRS nodes are connected to the SmarTone HK GMSCs in a cross-connected mode.

The case of a SmarTone HK Subscriber Roaming in SmarTone Macau with a SmarTone HK IMSI is treated as normal roaming and is not routed to the SPRS. The update_location request goes directly to SmarTone HK, and the subsequent single SPC. All E1 links from the same GMSC go to the two systems functioning as a link set. The SPRS boxes can be connected to the SmarTone HK GMSCs in a cross-connected mode. Such an arrangement is illustrated in FIG. 13, which shows SmarTone HK GMSCs 1302A. SmarTone Macau includes a GMSC 1302B. SmarTone Macau further includes two SPRSs 1306.

Figure 14:
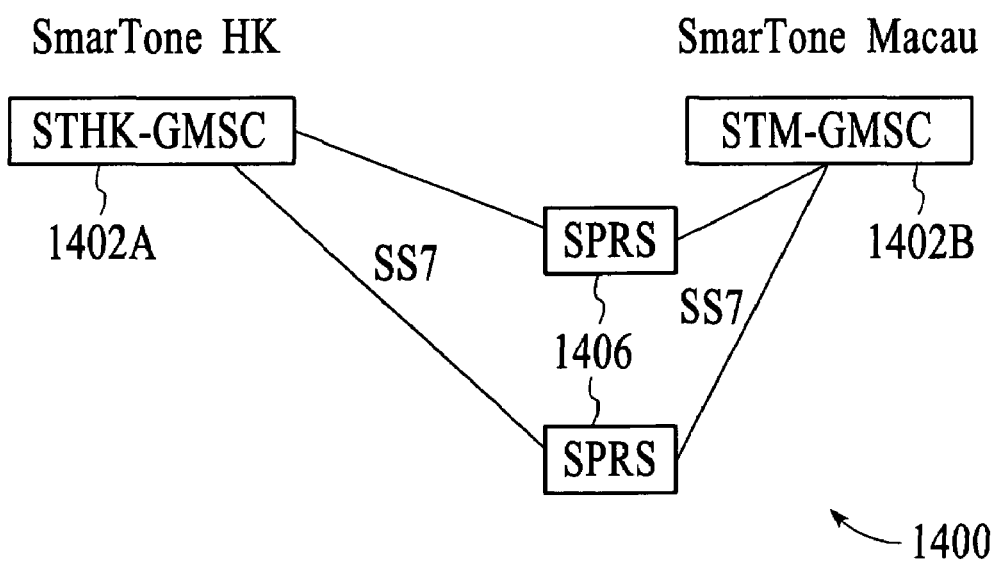
FIG. 14 is a block diagram of an embodiment in which multiple SPRS nodes are connected to the same SmarTone HK GMSC.

The SPRS boxes can also be connected to the same SmarTone HK GMSC, as shown in FIG. 14. In FIG. 14, SmarTone HK Macau has a GMSC 1402B, and two SPRSs 1406 that are connected to a SmarTone HK GMSC 1402A.

Transaction Performance and Volumes

Unlike the case of voice roaming in which only MAP messages are going through the SPRS node (not voice), the GPRS data traffic is also going through the SPRS (directly or indirectly). If it is directly through SPRS for GPRS data, SPRS must be equipped with some SGSN/GGSN function, in particular the Gp interface. Indirectly, the SPRS can be integrated with a carrier's existing SGSN or GGSN. However, certain modifications should be made in order to proxy and relay packets across the SPRS box. Some assumptions made in an example case are as follows: 12000 roamers; ½ Mbyte per roamer per day (6000 Mbyte messages per day); distribution over an 8-hour period (750 MB messages per hour 2 Mb per second). In one embodiment, the SPRS box is equipped with a dual Ethernet 100 Mb or gigabit interface. In one embodiment, a Dell 2.4 gHz Xeon dual CPU or SunFire 480 dual CPU 900 Mhz with a GB RAM is sufficient to achieve this.

Availability Considerations

Given the duplicated SS7 architecture previously described, there are at least two ways to perform load balancing. In one method, each SPRS box is assigned a different IP address. The DNS server at ST Macau will has two entries for each of the IP address for any APN not recognized to have a roaming relationship with ST Macau. Similarly, the DNS server used by the GRX of the roaming partners of ST HK also has two entries for each of the IP address for any fictitious APN that ST HK assign for SmarTone Macau APNs. DNS update and propagation through GRX can be controlled or initiated from ST HK by the DNS server at its end, and does not need to involve operations from the roaming partners.

Another way to achieve load balancing is to assign both SPRS boxes the same virtual IP address in a cluster. Both SPRS boxes are synchronized on tunnel and PDP context using a shared storage array and a clustered DB. In either case, unlike pure SS7-based SPRS, packets or user data usage needs to be monitored. A charging gateway interface should be incorporated for billing, including handling prepaid transactions and fraud prevention.

Billing

Figure 15:
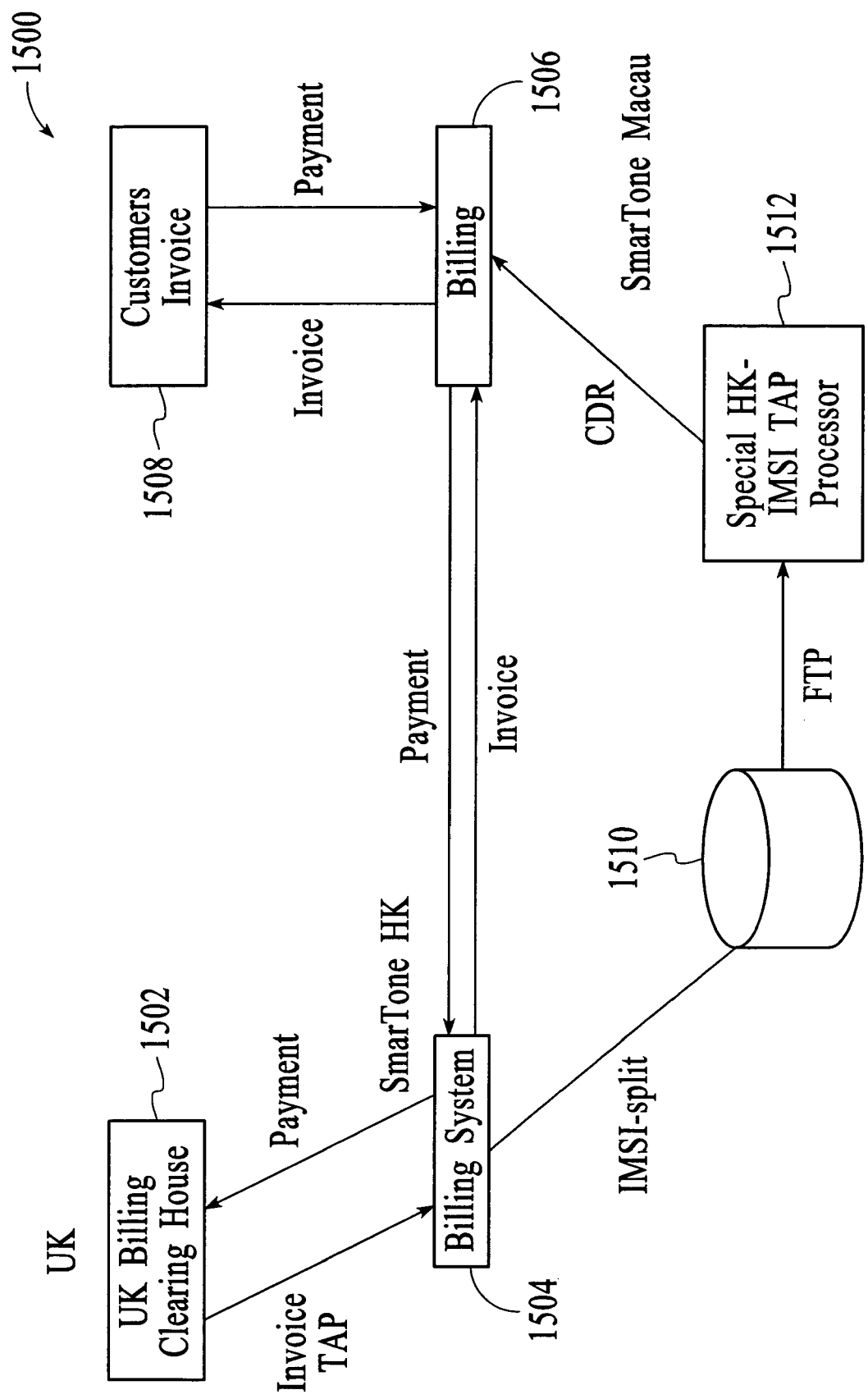
FIG. 15 is a block diagram of an example billing framework for outbound roamers.

Billing can be customized for the SPRS for both inbound and outbound roaming. The following billing arrangement for inbound and outbound roamers is an example framework. Details depend on commercial agreements between SmarTone HK and SmarTone Macau, and between SmarTone HK and its roaming partners. TAP3 should be used to support SPRS for GPRS roaming FIG. 15 illustrates an example billing framework for outbound roamers. A UK billing/clearing house 1502, and a billing system 1504 on the SmarTone HK/UK side communicate with a billing system 1506 on the SmarTone Macau side. Customer data and invoices 1508 communicate with the billing system 1506. A special HK-IMSI TAP processor 1512 communicates with a database 1520 and the billing system 1506.

Because a SmarTone Macau outbound roamer will appear to a foreign network operators as a SmarTone HK IMSI, SmarTone HK will be responsible for the bill settlement with the foreign operators. TAP files will be presented to SmarTone HK by the foreign operators who will have no idea which SmarTone HK IMSI is special or not. The SmarTone HK side will need to split the TAP files to form files containing special SmarTone HK IMSI. SmarTone HK can relay these files to SmarTone Macau. SmarTone Macau charges the outbound roaming subscriber (MT TAP+IDD)*(1+Y %+X %) for MT calls and (MO TAP)*(1+Y %+X %) for MO calls where Y is the % of service charge SmarTone Macau charges to the subscribers and X be the % of charge that SmarTone Macau gives to SmarTone HK. SmarTone Macau pays SmarTone HK TAP charge plus the X % of the subscriber bill. SmarTone HK pays TAP bill to the foreign operators. MACH is a clearing house that does this kind of billing. If SmarTone uses MACH, then billing for outbound roaming can be arranged with MACH.

Figure 16:
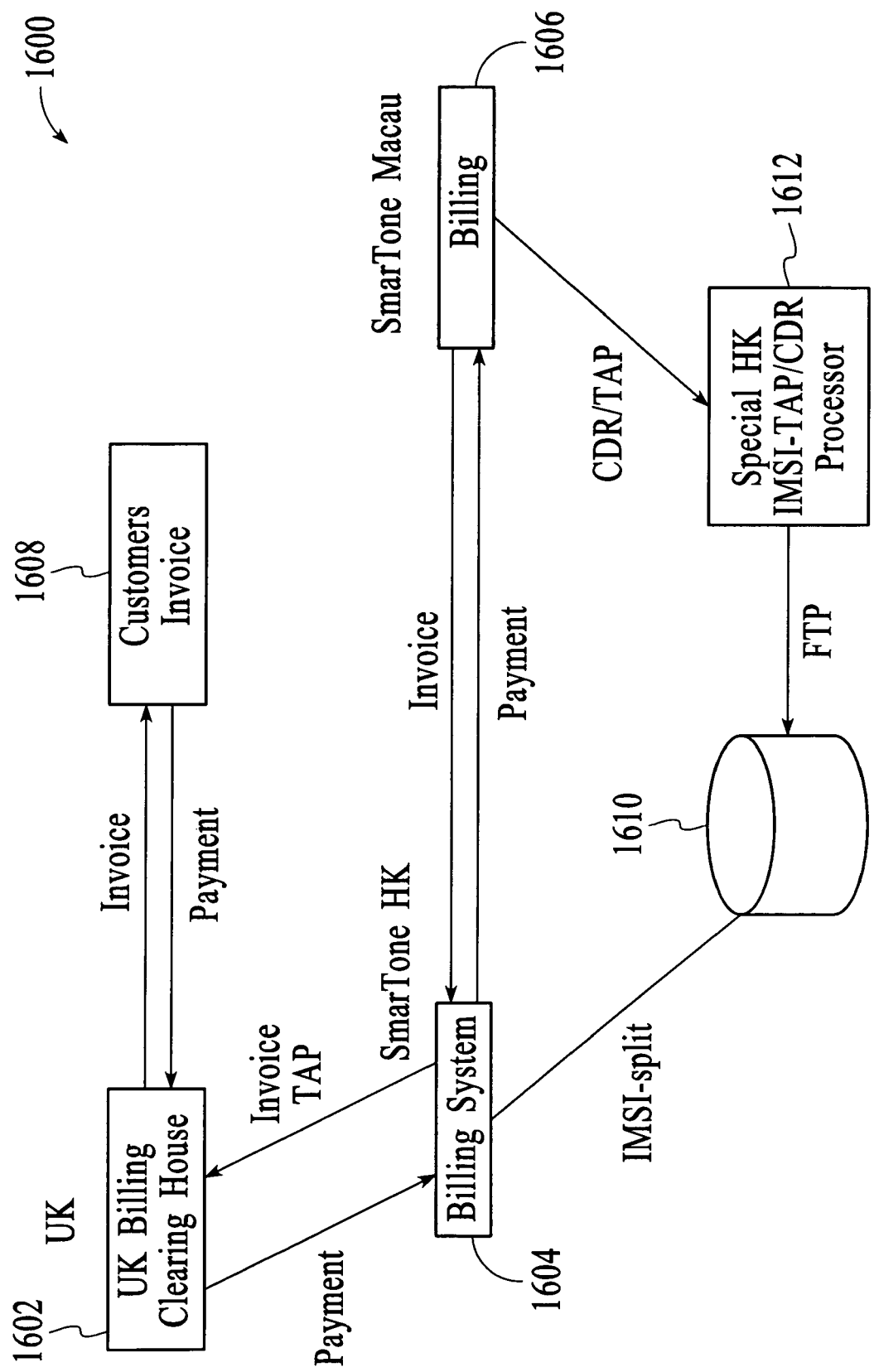
FIG. 16 is a block diagram of an example billing framework for inbound roamers.

FIG. 16 illustrates an example billing framework for inbound roamers. A UK billing/clearing house 1602, and a billing system 1604 on the SmarTone HK/UK side communicate with a billing system 1606 on the SmarTone Macau side. Customer data and invoices 1608 communicate with the billing system 1602. A special HK-IMSI TAP processor 1612 communicates with a database 1610 and the billing system 1604.

Because a SmarTone Macau inbound roamer will appear to foreign network operators as if he is in SmarTone HK whether he is making or receiving a call, SmarTone HK will be responsible for the bill settlement with the foreign operators.

SmarTone Macau should split CDR/TAP records whose charging party is from a non-roaming partner network. These CR/TAP records will be presented to SmarTone HK by the SmarTone Macau. SmarTone HK will need to modify the sending operator and any other parameters (such as LAI/LAC, Cell ID, Serving switch) to be a corresponding one defined in its network. The location-dependent parameters will be assigned a new address from SmarTone HK address space that corresponds to the SmarTone Macau location. Different tariffs can be applied for each of these special locations in SmarTone TAP.

If CDR files are sent from Smartone Macau for these non-roaming partner networks, then Smartone HK must use a procedure TAP accordingly.

For MO calls, because Smartone HK can apply a different tariff that is identical to the MO call originated from Smartone Macau, from a cost perspective, the home network of the However, subscribers' bill statements will indicate he/she made a call in HK rather than Macau. Subscriber might not notice due to the close proximity of the two places. But customer care of the home network need be prepared to explain it.

For MT calls, the possibility of the home network applying different IDD top up rates between HK and Macau should be considered. If the two IDD rates are the same, then there is no issue for home networks and the subscribers. If the IDD rate in HK is lowered than in Macau, inbound roamers will be happy, but the home network might not be happy (an unlikely scenario since the home operator should be happy that it makes some money due to the extended roaming coverage).

However if the IDD rate in Macau is lowered than HK, inbound roamer will not be too happy, although home operators should be quite happy. One important fact is that the inbound is getting roaming service on a network in Macau, which was not possible in the past.

Hardware and Software

Various configurations of components can be used to operate the services described herein. In one embodiment, the components include a RoamWARE Application Server, SS7 cards, SGSN functions etc.

Table 30 lists the specifications for different hardware components for hosting and running the SPRS Service in one embodiment.

TABLE 30

| S.No | Description | Qty | Comments |
|---|---|---|---|
| 1. | Sun Fire 480 dual CPU 900 MHz | 2 | Clustered and non-NEBS compliant |
|  | Or Intel Xeon 2.4 GHz dual CPU With MS AS/W2k or RedHat AS2.1 | 2 | Clustered but not NEBS compliant |
| 2. | Intel Septel SS7 Cards | 2 | Each card has 4 E1 links |
| 3. | SS7 protocol stack for Septel cards | 2 | MTP2, MTP3, SCCP |
| 4. | ASN.1 Compiler | 2 |  |
| 5. | SQL, RedHat or Oracle 9i | 2 |  |
| 6 | SGSN | 2 |  |

The above description of illustrated embodiments of the SPRS method and system is not intended to be exhaustive or to limit the invention to the precise form disclosed. While specific embodiments of, and examples for, the SPRS method and system are described herein for illustrative purposes, various equivalent modifications are possible within the scope of the invention, as those skilled in the relevant art will recognize. The teachings of the SPRS method and system provided herein can be applied to other communications systems, not only to the communications systems described above.

The elements and acts of the various embodiments described above can be combined to provide further embodiments. These and other changes can be made to the SPRS method and system of an embodiment in light of the above detailed description.

In general, in the following claims, the terms used should not be construed to limit the SPRS method and system to the specific embodiments disclosed in the specification and the claims, but should be construed to include all communications systems that operate under the claims to provide the SPRS method and system. Accordingly, the SPRS method and system is not limited by the disclosure, but instead the scope of the SPRS method and system is to be determined entirely by the claims.

While certain aspects of the SPRS method and system are presented below in certain claim forms, the inventors contemplate the various aspects of the SPRS method and system in any number of claim forms. For example, while only one aspect of the SPRS method and system is recited as embodied in an electronically readable medium, other aspects may likewise be embodied in an electronically readable medium. Accordingly, the inventors reserve the right to add additional claims after filing the application to pursue such additional claim forms for other aspects of the SPRS method and system.

What is claimed is:

1. A method for inbound roaming wireless communication from a home network to a destination network related to a sponsoring network, comprising:

receiving a plurality of messages at the destination network from a home network subscriber device, wherein the device is roaming into the destination network;

establishing a communications link with the destination network;

modifying at least one of the plurality of messages, wherein the modifying includes using a signal gateway to trap at least one of the plurality of messages and modify a parameter associated with the at least one of the plurality of messages so that the modified message appears to the home network as originating from a sponsoring network based on the at least one modified parameter; and transmitting over the communications link at feast one selected from a group consisting of voice and data;

wherein the modifying further comprises encapsulating the at least one of the plurality of messages in a forward short message service (FSMS) message at a first signaling and packet relay system (SPRS) node and transmitting the encapsulated message to a second SPRS node, different from the first SPRS node, wherein the destination network is a sponsored network of the sponsoring network to support inbound roaming, and wherein the modification of parameters include at least one of mapping of visit addresses in the sponsored network and sponsoring network addresses, and mapping of home addresses in other operator networks and sponsoring network addresses.

2. The method of claim 1, wherein the plurality of messages include a GPRS session message.

3. The method of claim 1, further comprising routing the plurality of messages to at least one signaling and packet relay system (SPRS) node.

4. The method of claim 1, wherein the modification of parameters include at least one of mapping of a home network international mobile subscriber identity (IMSI) and a sponsoring network IMSI, mapping of visit addresses in the destination network and sponsoring network addresses, mapping of home addresses in the home network and sponsoring network addresses, and mapping of customized applications for mobile enhanced logic (CAMEL) service control point (SCP) addresses of the home network and sponsoring network addresses.

5. The method of claim 1, further comprising the sponsoring network routing messages from the home network to a signaling and packet relay system (SPRS) node.

6. The method of claim 1, further comprising the home network routing messages from the home network to a signaling and packet relay system (SPRS) node.

7. The method of claim 1, wherein the home network is a sponsored network of the sponsoring network to support outbound roaming.

8. The method of claim 7, wherein the home subscriber device comprises a modified single IMSI SIM.

9. The method of claim 1, wherein the home subscriber device comprises a dual international mobile subscriber identity (IMSI) subscriber identity module (SIM).

10. The method of claim 1, wherein receiving the plurality of messages further comprises using a designated translation type.

11. The method of claim 1, further comprising using a private connection to receive the plurality of messages.

12. The method of claim 1, wherein receiving the plurality of messages further comprises modification of a global title.

13. The method of claim 1, wherein receiving the plurality of messages further comprises prefixing a called address with a designated routing number.

14. The method of claim 1 wherein receiving the plurality of messages further comprises prefixing a calling address with a designated routing number.

15. A mobile communications system for transmitting voice and data, the system comprising:

a sponsored network;

a sponsoring network;

a plurality of other operator networks, which have no direct roaming agreements with the sponsored network; and at least one signaling packet relay system (SPRS) node coupled to the sponsored network and the sponsoring network, wherein messages between the plurality of other operator networks and the sponsored network are routed to the SPRS node, wherein the SPRS node traps the messages and modifies a parameter associated with each message to obtain modified messages that appear to originate from the sponsoring network based on the modified parameter of each message, wherein the at least one SPRS node includes:
a first SPRS node coupled to a GMSC of the sponsored network; and
a second SPRS node coupled to a GMSC of the sponsoring network,
wherein the first SPRS node encapsulates the at least one of the plurality of messages in a forward short message service (FSMS) message and transmits the encapsulated message to a second SPRS node,
wherein the first SPRS node is different from the second SPRS node,
wherein the SPRS node is coupled to the sponsored network through a first packet data relay (PDP) tunnel, and coupled to the plurality of other operator networks through a second PDP tunnel, which is different from the first PDP tunnel, and
wherein the first PDP tunnel, and the second PDP tunnel each comprise a general packet radio service (GPRS) roaming exchange (GRX), and
wherein one of the GRXs is coupled to an SGSN at the partner network, and another one of the GRXs is coupled to a GGSN at the sponsored network.

16. The mobile communications system of claim 15, wherein the SPRS node is further coupled to the sponsored network and to the roaming partner network through at least one SS7 node.

17. The mobile communications system of claim 15, wherein the messages are routed using a designated translation type.

18. The mobile communications system of claim 17, the system further comprising:
at least one signal transfer point (STP) coupled to the sponsoring network GMSC; and
a GMSC of the sponsored network coupled to the at least one STP.

19. The mobile communications system of claim 15, wherein the messages are routed using a private connection.

20. The mobile communications system of claim 19, the system further comprising:
at least one signal transfer point (ST P) coupled between the sponsoring network GMSC and the sponsored network GMSC.

21. The mobile communications system of claim 15, wherein routing the messages includes modifying a global title.

22. The mobile communications system of claim 21, the system further comprising:
at least one signal transfer point (STP) coupled between the sponsoring network GMSC and the sponsored network GMSC.

23. The method of claim 15, wherein the sponsoring network has a roaming agreement with at least one of the plurality of other operator networks.

24. The method of claim 15, wherein the sponsoring network has a roaming agreement with the sponsored network.

25. The method of claim 15, wherein the sponsoring network has no roaming agreement with the sponsored network.

26. The method of claim 15, wherein the sponsoring network is a hub network operator.

27. The method of claim 15, wherein at least one of the plurality of messages routed to the SPRS node includes a customized applications for mobile enhanced logic (CAMEL) message.

28. A computer readable medium having stored thereon instructions executed in a mobile communications system for:
receiving a plurality of messages at a destination network from a subscriber device of a home network, wherein the subscriber device is roaming into the destination network;
establishing a communications link with a destination network;
modifying at least one of the first-plurality of messages, wherein the modifying includes using a signal gateway to trap at least one of the plurality of messages and modify a parameter associated with the at least one of the plurality of messages so that the modified message appears to the home network as originating from the sponsoring network based on the modified parameter; and
transmitting over the communications link at least one selected from the group consisting of voice and data,
wherein the modifying further comprises encapsulating the at least one of the plurality of messages in a forward short message service (FSMS) message at a first signaling and packet relay system (SPRS) node and transmitting the encapsulated message to a second SPRS node, different from the first SPRS node,
wherein the destination network is a sponsored network of the sponsoring network to support inbound roaming, and
wherein the modification of parameters include at least one of mapping of visit addresses in the sponsored network and sponsoring network addresses, and mapping of home addresses in other operator networks and sponsoring network addresses.

29. The computer readable medium of claim 28, wherein the plurality of messages include a GPRS session message.

30. The computer readable medium of claim 28, wherein the instructions are further executed in the mobile communications system for routing the plurality of messages to at least one signaling and packet relay system (SPRS) node.

31. The computer readable medium of claim 28, wherein the plurality of messages include messages from networks who are not roaming partners of the home network.

32. The computer readable medium of claim 28, wherein the instructions are further executed in the mobile communications system for causing the sponsoring network routing messages from the home network to a signaling and packet relay system (SPRS) node.

33. The computer readable medium of claim 28, wherein the instructions are further executed in the mobile communications system for causing the home network routing messages from the home network to a signaling and packet relay system (SPRS) node.

34. The computer readable medium of claim 28, wherein the instructions are further executed in the mobile communications system for transmitting modified messages through a GMSC.

35. The computer readable medium of claim 28, wherein the home network is a sponsored network of the sponsoring network to support outbound roaming.

36. The computer readable medium of claim 35, wherein the home subscriber device comprises a dual IMSI SIM.

37. The computer readable medium of claim 35, wherein the home subscriber device comprises a modified single IMSI SIM.

38. The computer readable medium of claim 28, wherein receiving the plurality of messages further comprises using a designated translation type.

39. The computer readable medium of claim 28, wherein the instructions are further executed in the mobile communications system for using a private connection to receive the plurality of messages.

40. The computer readable medium of claim 28, wherein receiving the plurality of messages further comprises modification of a global title.

41. The computer readable medium of claim 28, wherein receiving the plurality of messages further comprises prefixing a called address with a designated routing number.

42. The computer readable medium of claim 28, where the destination network is a sponsored network of the sponsoring network to support inbound roaming.

* * * * *